US007124326B1

(12) United States Patent
Niikawa

(10) Patent No.: US 7,124,326 B1
(45) Date of Patent: Oct. 17, 2006

(54) METHOD AND APPARATUS FOR DIAGNOSING ELECTRONIC DEVICE

(75) Inventor: Masahito Niikawa, Sakai (JP)

(73) Assignee: Minolta Co., Ltd., Osaka (JP)

( * ) Notice: Subject to any disclaimer, the term of this patent is extended or adjusted under 35 U.S.C. 154(b) by 234 days.

(21) Appl. No.: 09/711,049

(22) Filed: Nov. 9, 2000

(30) Foreign Application Priority Data

Nov. 15, 1999 (JP) ............................... P11-324289

(51) Int. Cl.
G06F 11/00 (2006.01)

(52) U.S. Cl. ............................ 714/37; 714/44; 714/48; 702/183

(58) Field of Classification Search ................. 714/37, 714/46, 57, 48, 27, 44; 702/188, 183
See application file for complete search history.

(56) References Cited

U.S. PATENT DOCUMENTS

| 5,678,002 | A  | * | 10/1997 | Fawcett et al. ............. 345/709 |
| 5,903,626 | A  | * | 5/1999  | Iglehart et al. ............. 379/28  |
| 6,065,136 | A  | * | 5/2000  | Kuwabara .................... 714/31  |
| 6,260,160 | B1 | * | 7/2001  | Beyda et al. ................. 714/27 |
| 6,298,457 | B1 | * | 10/2001 | Rachlin et al. ............... 714/49 |
| 6,321,348 | B1 | * | 11/2001 | Kobata ........................ 714/37 |
| 6,343,236 | B1 | * | 1/2002  | Gibson et al. ................ 700/79 |
| 6,357,017 | B1 | * | 3/2002  | Bereiter et al. .............. 714/27 |
| 6,367,035 | B1 | * | 4/2002  | White ......................... 714/40 |
| 6,408,407 | B1 | * | 6/2002  | Sadler ......................... 714/57 |
| 6,415,395 | B1 | * | 7/2002  | Varma et al. ................. 714/37 |
| 6,421,793 | B1 | * | 7/2002  | Lester et al. ................. 714/37 |
| 6,438,711 | B1 | * | 8/2002  | Woodruff ..................... 714/27 |
| 6,442,714 | B1 | * | 8/2002  | Griffin et al. ................ 714/46 |
| 6,516,427 | B1 | * | 2/2003  | Keyes et al. ................. 714/25 |
| 6,539,499 | B1 | * | 3/2003  | Stedman et al. .............. 714/40 |
| 6,550,021 | B1 | * | 4/2003  | Dalphy et al. ................ 714/11 |
| 6,557,118 | B1 | * | 4/2003  | Schleiss et al. .............. 714/37 |
| 6,584,430 | B1 | * | 6/2003  | Rosenbaum et al. ........ 702/183 |
| 6,601,190 | B1 | * | 7/2003  | Meyer et al. ................. 714/37 |
| 6,665,085 | B1 | * | 12/2003 | Edmunds et al. .......... 358/1.15 |

FOREIGN PATENT DOCUMENTS

| JP | 06-035521    | 2/1994  |
| JP | 06-035521 A  | 2/1994  |
| JP | 06-043538    | 2/1994  |
| JP | 07-005555    | 1/1995  |
| JP | 08-287195    | 11/1996 |
| JP | 9-261550 A   | 10/1997 |
| JP | 9-297694 A   | 11/1997 |
| JP | 11-252298 A  | 9/1999  |

OTHER PUBLICATIONS

Computer Dictionary Third Edition, 1997, Microsoft Press, 3rd Edition, p. 180.*

* cited by examiner

Primary Examiner—Robert Beausoliel
Assistant Examiner—Marc Duncan
(74) Attorney, Agent, or Firm—Sidney Austin LLP

(57) ABSTRACT

Downloading of an inspection program for an electronic device to be supported is accepted on the home page of the support center. The user executes the downloaded inspection program on the electronic device to generate inspection results. Then, uploading of the inspection results is accepted on the home page, a computer of the support center analyzes the uploaded inspection results to generate a diagnosis result, and the diagnosis result including necessity of repair is transferred to the user. Thereby, it is possible to properly and quickly diagnose the electronic device on the user's side and reduce the support cost by preventing unnecessary transport of the electronic device.

18 Claims, 39 Drawing Sheets

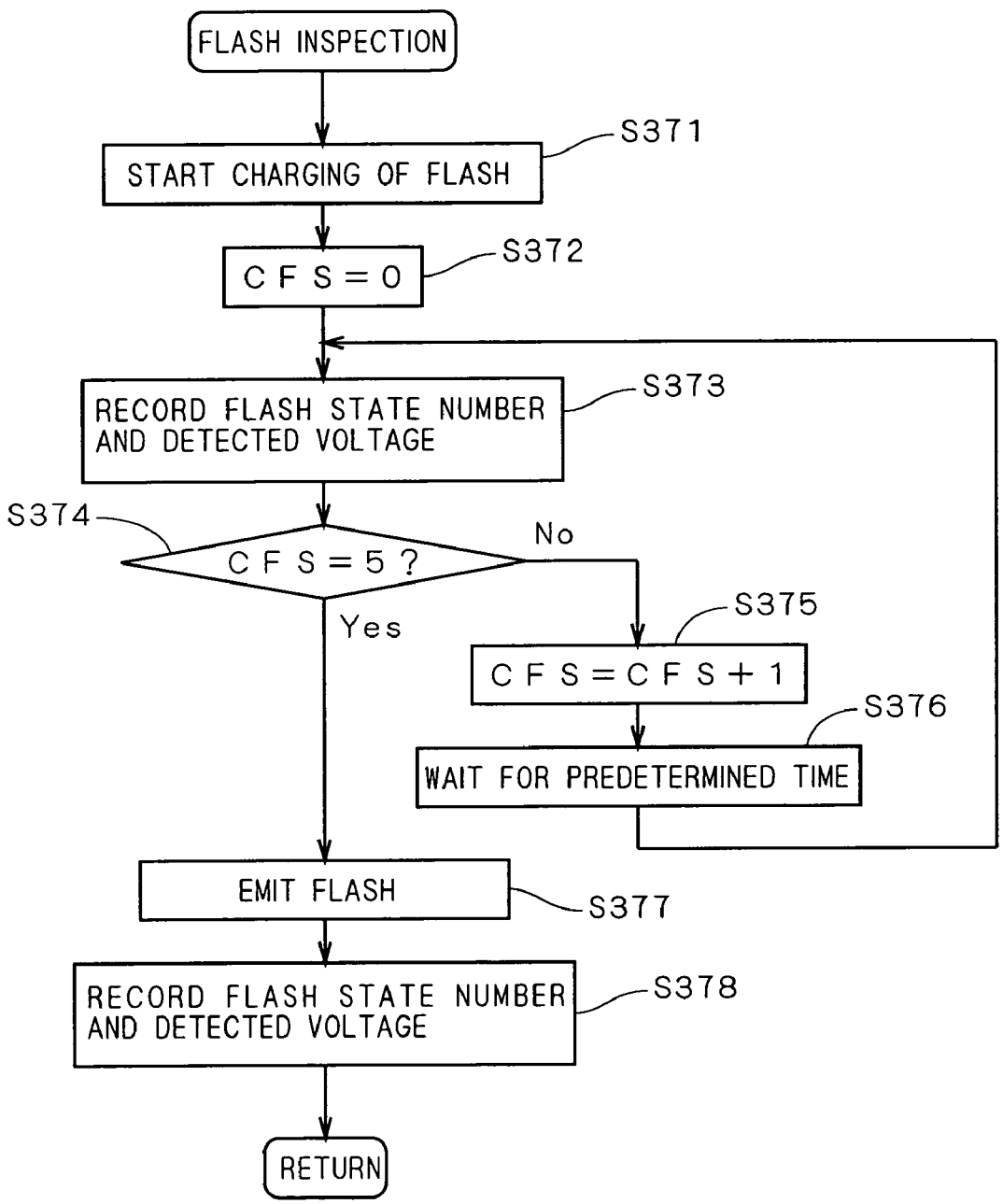
F I G. 16

FIG. 29

SUPPORT-CENTER HOME PAGE

● DOWNLOADING OF SELF-INSPECTION SOFTWARE
● UPLOADING OF INSPECTION RESULT FILE
● INQUIRY ABOUT REPAIR STATE

RETURN TO TOP PAGE

FIG. 30

SUPPORT-CENTER HOME PAGE

DOWNLOADING OF SELF-INSPECTION SOFTWARE

CLICK START BUTTON FOR
DOWNLOAD

START

SUPPORT-CENTER HOME PAGE
UPLOADING OF INSPECTION RESULT FILE
INPUT YOUR NAME AND CONTACT DESTINATION
ADDRESS: _____
NAME:           _____
TELEPHONE NUMBER: _____
E-MAIL ADDRESS:   _____
[ NEXT ]

SUPPORT-CENTER HOME PAGE
UPLOADING OF INSPECTION RESULT FILE

DRAG AND DROP INSPECTION
RESULT FILE

[ NEXT ]

```
SUPPORT-CENTER HOME PAGE
  UPLOADING OF INSPECTION RESULT

UNDER PROCESSING
     WAIT FOR A WHILE
```

FIG. 35

```
SUPPORT-CENTER HOME PAGE

DIAGNOSIS RESULT
          UPLOADED FILE IS NOT
          INSPECTION RESULT FILE

INQUIRY-DESTINATION MAIL ADDRESS

[ RETURN TO TOP PAGE ]
```

FIG. 36

```
SUPPORT-CENTER HOME PAGE

DIAGNOSIS RESULT  CAMERA IS PROBABLY NORMAL
              RESTART CAMERA
              AND CONFIRM MANUAL

USAGE INQUIRY DESTINATION MAIL ADDRESS

[ RETURN TO TOP PAGE ]
```

FIG. 37

```
SUPPORT-CENTER HOME PAGE
  DIAGNOSIS RESULT   REPLACE BATTERY

INQUIRY-DESTINATION MAIL ADDRESS

[ RETURN TO TOP PAGE ]
```

FIG. 38

```
SUPPORT-CENTER HOME PAGE

DIAGNOSIS RESULT  REST OF AREA IN MEMORY
                  CARD IS INSUFFICIENT

INQUIRY-DESTINATION MAIL ADDRESS

[ RETURN TO TOP PAGE ]
```

FIG. 39

```
SUPPORT-CENTER HOME PAGE

DIAGNOSIS RESULT  REPAIR IS NECESSARY
                  PLEASE SEND YOUR CAMERA
                  TO SUPPORT CENTER
                  ADDRESS: ············

[ TO REPAIR ACCEPTANCE ]
```

F I G. 40

SUPPORT-CENTER HOME PAGE

REPAIR ACCEPTANCE
                ENTER COMMENT IF NECESSARY

COMMENT:

[ REQUEST REPAIR ]

F I G. 41

SUPPORT-CENTER HOME PAGE

REPAIR IS ACCEPTED
    YOUR ACCEPTANCE NUMBER IS
    0 0 0 2 5 4
    RECORD ACCEPTANCE NUMBER BECAUSE
    IT MAY BE NECESSARY FOR FUTURE INQUIRY

[ RETURN TO TOP PAGE ]

FIG. 42

```
SUPPORT-CENTER HOME PAGE
   INQUIRY ABOUT REPAIR STATE

INPUT YOUR ACCEPTANCE NUMBER

_____

[ NEXT ]
```

FIG. 43

```
SUPPORT-CENTER HOME PAGE
INQUIRY ABOUT REPAIR STATE
  ACCEPTANCE NUMBER : 000234   ADDRESS : ........................
                     NAME :              ............
                     TELEPHONE NUMBER :  ............
                     E-MAIL ADDRESS :    ............
       ANSWER: ALREADY SENT ON···MONTH···DAY

[ RETURN TO TOP PAGE ]
```

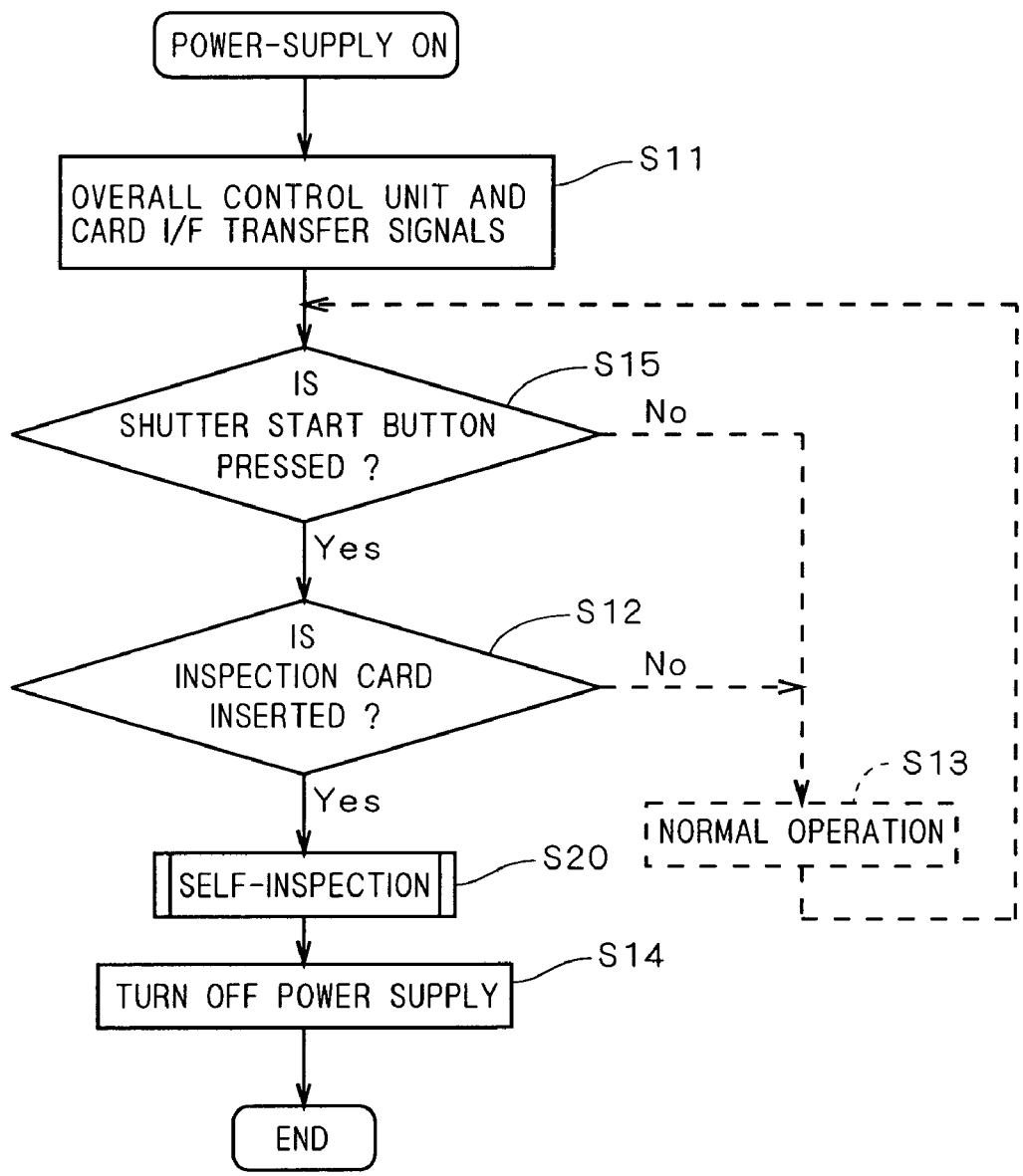
F I G. 48

METHOD AND APPARATUS FOR DIAGNOSING ELECTRONIC DEVICE

This application is based on an application No. 11-324289 (1999) filed in Japan, the contents of which are hereby incorporated by reference.

BACKGROUND OF THE INVENTION

1. Field of the Invention

The present invention relates to a technique for diagnosing an electronic device in support of household electronic devices of users.

2. Description of the Background Art

Household electronic devices have been supported so far by makers (after-sale service). FIG. 50 is an illustration schematically showing a flow of procedures between a user of an electronic device (or a customer in support of an electronic device) and a support division (so-called service center) of a maker in a conventional support system.

First, when a user finds a malfunction of an electronic device, the user inquires of the maker's support division about how to repair the malfunction through a telephone (steps ST911 and ST921). When the support division can clearly determine how to repair the malfunction, they answer how to repair the malfunction to the user. However, in many cases, they cannot determine how to repair the malfunction and therefore, they designate a repair method considered to be probably proper to the user (steps ST922 and ST912).

The user takes action for the malfunction in accordance with the designation from the support division (step ST913). When the malfunction is repaired in accordance with the designation, the support procedure is completed (step ST914). However, if the malfunction cannot be repaired, the user communicates with the support division many times (step ST915). During the above period, when the user or the support division determines that the malfunction cannot be repaired by the user, the electronic device is mailed or brought to the support division (steps ST916 and ST923).

The support division inspects the received electronic device. When a trouble is found, they eliminate the trouble and return the device to the user (steps ST924, ST925, and ST917). When no trouble is found, they estimate that the user erroneously operated the electronic device and return the device to the user.

However, because household electronic devices have become sophisticated and complicated, a problem occurs that the above support system cannot completely function. For example, even if a user finds a trouble and inquires of the support division through a telephone, the user cannot easily communicate with the support division because the number of inquiries increases. Moreover, though users can inquire by facsimile or E-mail recently, in many cases, it takes a lot of time to receive an answer because the number of inquiries increases.

Furthermore, because household electronic devices have become sophisticated and complicated, it has been difficult for the support division to clarify the cause of trouble only through communication from a user. For example, the number of cases increases in which a user feels that operations of an electronic device are somehow different from past operations though the device operates, or a user misunderstands that an electronic device is broken down though the device operates normally. In these cases, it is very difficult for the support division to clarify the cause of trouble only by the transfer of information through the conversation between the user and the support division.

The electronic device having trouble is sent to a support division when repair method cannot be found. However, the trouble is not reproduced by the support division and resultantly, no action is taken for the trouble. As a result, the device is returned to the user and thus, the user has dissatisfaction.

Unnecessary transport of an electronic device is wasteful in cost and moreover, a precise electronic device may be broken down or the information stored in the device may be lost.

Of course, there has been an art of informing the type of trouble caused in an electronic device to a user. For example, the official gazette of Japanese Patent Laid-Open No. 7-5555 (1995) discloses a self-diagnosing camera in which a diagnosis result is displayed on a film counter as code information. Moreover, the official gazette of Japanese Patent Laid-Open No. 6-43538 (1994) discloses a camera for recording self-diagnosis information in a film.

However, information of conventional diagnosis does not show that the device is normal, trouble of the device can be settled or cannot be settled by the user, or does not clearly show how to do next. That is, finally, inefficient information transfer through conversation or documents may be necessary between the above user and the support division and in some cases, an excessive support cost is required.

SUMMARY OF THE INVENTION

The present invention is directed to a method of diagnosing an electronic device that belongs to a customer.

According to one aspect of the present invention, the method comprises the steps of: receiving an inspection result obtained by executing an inspection program on the electronic device on the customer's side; and obtaining a diagnosis result by diagnosing the electronic device on the basis of the inspection result.

The present invention makes it possible to properly diagnose the electronic device which exists on the customer's side.

In another aspect of the present invention, the inspection result is received through computer communication. It is possible to easily receive the inspection result through computer communication.

In another aspect of the present invention, the method further comprises the step of transmitting the diagnosis result to the customer. The customer is immediately informed of the diagnosis result.

In another aspect of the present invention, the diagnosis result including information whether the electronic device needs repair or not. The customer can recognize whether the electronic device needs repair or not, and whether it is necessary to send the electronic device.

The present invention is also directed to an apparatus and a computer-readable medium carrying a program for diagnosing an electronic device through computer communication.

Accordingly, an object of the invention is to reduce the support cost for the electronic device by transferring information between the user and the support division efficiently.

These and other objects, features, aspects, and advantages of the present invention will become more apparent from the following detailed description of the present invention when taken in conjunction with the accompanying drawings.

BRIEF DESCRIPTION OF THE DRAWINGS

FIG. 16 is a flowchart showing operations of the digital camera under the flash inspection;

FIG. 29 is an illustration showing a main menu of the home page of the support center;

FIG. 30 is an illustration showing a home-page screen for downloading software;

FIGS. 35 to 39 are illustrations showing home-page screens in which diagnosis results are displayed;

FIG. 40 is an illustration showing a home-page screen for accepting repair;

FIG. 41 is an illustration showing a home-page screen for issuing an acceptance number;

FIGS. 42 and 43 are illustrations showing home-page screens for inquiries about repair states;

FIG. 48 is a flowchart showing general operations of the digital camera, relative to the self-inspection, which stores a self-inspection program;

DESCRIPTION OF THE PREFERRED EMBODIMENTS

1. First Preferred Embodiment

Preferred embodiments of the present invention are described below. In the preferred embodiments, a digital camera is adopted as a household electronic device which belongs to a user (or a customer) and needs support service. The configuration of the digital camera is previously described and then, procedures of support of the digital camera are described.

<1.1 Basic Configuration of Digital Camera>

Figure 3:
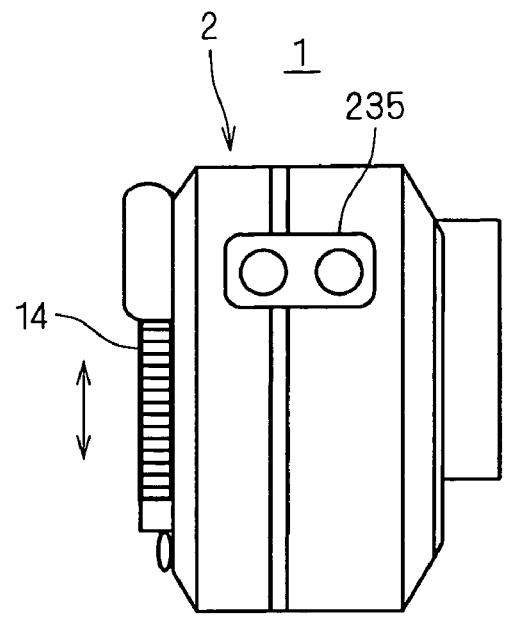
FIG. 3 is a side view of the digital camera.
Figure 4:
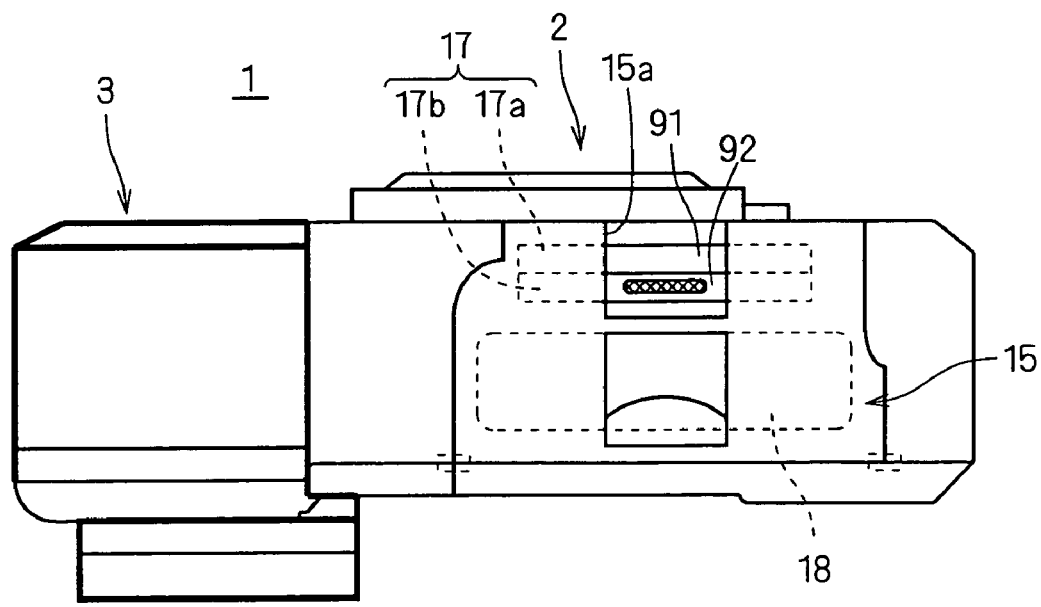
FIG. 4 is a bottom view of the digital camera.
Figure 5:
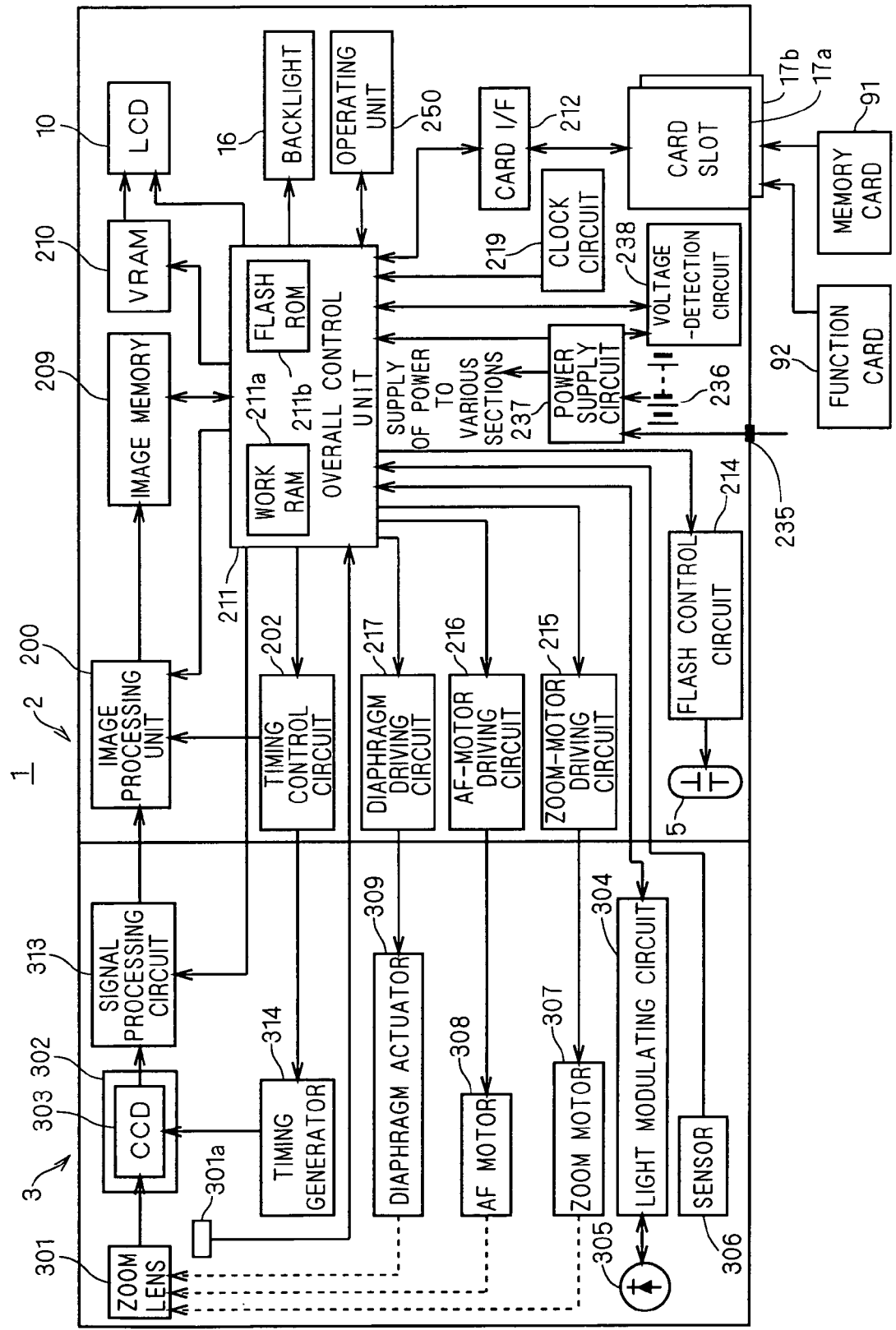
FIG. 5 is a block diagram showing an internal configuration of the digital camera.

FIGS. 1 to 4 are front view, rear view, side view, and bottom view of a digital camera 1 to be supported and FIG. 5 is a block diagram showing the internal configuration of the digital camera 1.

Figure 1:
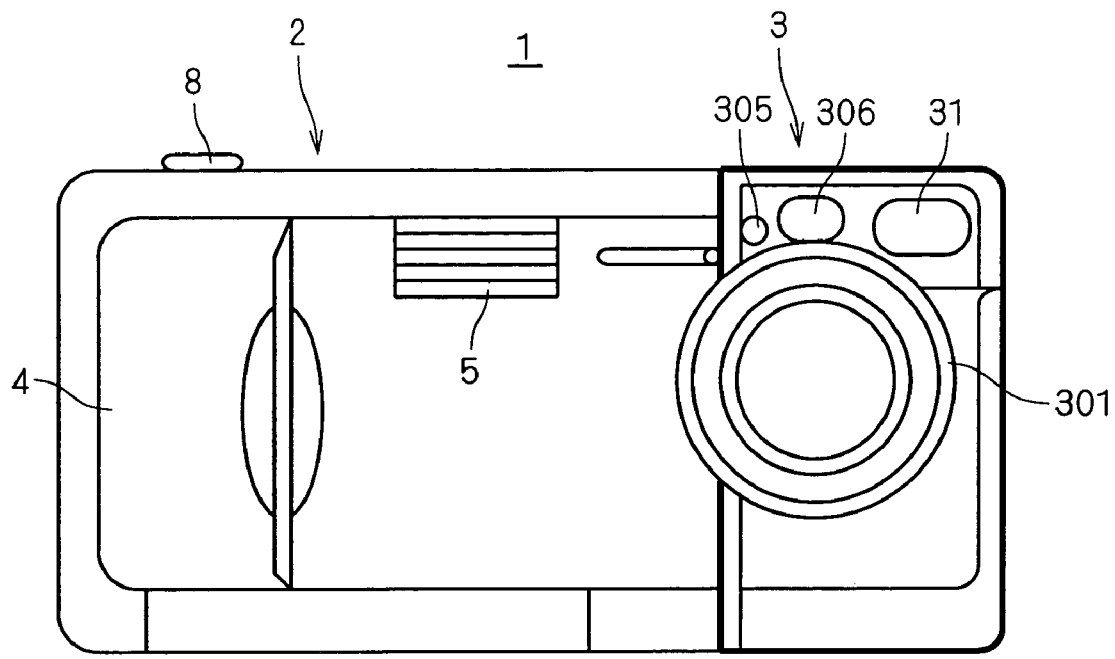
FIG. 1 is a front view of a digital camera which is an electronic device.
Figure 2:
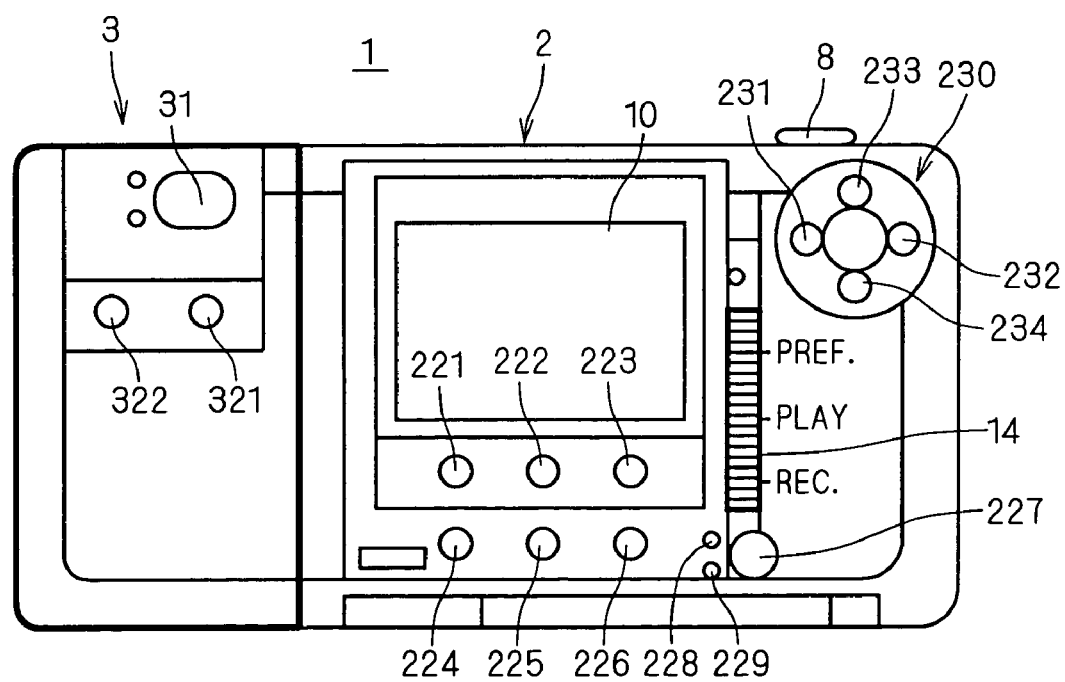
FIG. 2 is a rear view of the digital camera.

As shown in FIG. 1, the digital camera 1 is constituted of a box-type camera body 2 and a rectangular-parallelepiped imaging unit 3 (illustrated by a bold line FIGS. 1, 2, and 4). The imaging unit 3 has a zoom lens 301 which is a taking lens with macro-photography function. The imaging unit 3 is provided with a light modulating sensor 305 for receiving flash light reflected from a subject, a sensor 306 for measuring the distance up to the subject, and an optical finder 31 similarly to a camera for silver halide films.

A CCD 303 (a CCD color area sensor, cf. FIG. 5) is located behind the zoom lens 301 in the imaging unit 3 and the CCD 303 serves as a part of an imaging circuit 302.

As shown in FIG. 1, a grip portion 4 is provided for the left end of the front of the camera body 2, a built-in flash 5 is provided for the central upper portion of the camera body 2, and a shutter start button 8 is provided for the upper face.

As shown in FIG. 2, an LCD 10 for monitoring an image to be captured (corresponding to view finder) and playback of a recorded image is provided for the almost center of the back of the camera body. Moreover, a group of key switches 221 to 226 for operating the digital camera 1 and a power-supply switch 227 are provided below the LCD 10. An LED 228 to be turned on when a power supply is turned on and an LED 229 for indicating access to a memory card are arranged at the left of the power-supply switch 227.

Moreover, a mode selection switch 14 for switching modes between "recording mode", "playback mode", and "preference mode" is provided for the back of the camera body 2 (refer to FIG. 3). The recording mode is a mode for taking a picture or displaying a temporarily-captured image on the LCD 10, the playback mode is a mode for playing back and displaying images recorded in a memory card on the LCD 10, and the preference mode is a mode for making various settings by selecting displayed items.

The mode selection switch 14 is a three-position slide switch. In FIG. 2, the recording mode is selected by setting the switch 14 to the lower side, the playback mode is selected by setting the switch 14 to the middle, and the preference mode is selected by setting the switch 14 to the upper side.

A four-way switch 230 is provided for the right of the back of the camera, which performs zooming by pressing buttons 231 and 232 and performs exposure correction by pressing buttons 233 and 234.

As shown in FIG. 2, an LCD button 321 for turning on/off the LCD 10 and a macro button 322 are provided for the back of the imaging unit 3. When the LCD button is pressed, LCD display is turned on/off. For example, when taking a picture by using only the optical finder 31, LCD display is turned off to save power. In macro-photography, the macro button 322 is pressed and thereby, an AF motor 308 (refer to FIG. 5) is driven and the zoom lens 301 is ready for macro-photography.

As shown in FIG. 3, a DC input terminal 235 is provided for the side face of the camera body 2.

As shown in FIG. 4, a battery compartment 18 and a card compartment 17 are provided for the bottom face of the camera body 2. The card compartment 17 has two card slots 17a and 17b for mounting a memory card 91 and a function card 92. Both compartments are opened or closed by a clam shell lid 15.

Herein, the function card denotes a card for adding a predetermined function other than data storage to the electronic device (digital camera 1 in the case of this preferred embodiment) in the form of hardware by inserting the card into a card slot. Examples of the function card include an audio card, a video card, a modem card, an ISDN card, a USB card, and an IEEE-1394 card, and any other card except memory cards. In FIG. 4, one memory card 91 and one function card 92 are inserted into the card slots 17a and 17b, respectively. In the following description, an "electronic card" denotes a memory card or a function card.

An opening 15a is formed on the lid 15 and therefore, a connector of the function card 92 inserted in either card slot is exposed to the outside when the lid 15 is closed. Thereby, it is possible to connect with an external device while closing the lid 15.

The digital camera 1 uses a power battery 236 (refer to FIG. 5) constituted by four AA dry cells inserted into the battery compartment 18 and connected in series as a driving source. It is possible to operate the digital camera 1 by supplying the power from an adapter to the camera 1 through the DC input terminal 235 shown in FIG. 4.

Then, the internal configuration of the imaging unit 3 is described below by referring to FIG. 5.

The imaging circuit 302 performs photoelectric-conversions of the optical image of a subject formed on the CCD 303 by the zoom lens 301, through the use of the CCD 303, and outputs the image as image signals composed of color components of R (red), G (green), and B (blue) (a sequence of signals generated by pixels).

On the digital camera 1, exposure control in the imaging unit 3 is performed by adjusting not only the diaphragm but also the exposure value of the CCD 303 (charge accumulation time of the CCD 303 corresponding to shutter speed). Unless a proper shutter speed can be set when subject brightness is low, improper exposure due to underexposure is corrected by adjusting the level of the image signal output from the CCD 303. That is, exposure control is performed by combining shutter speed with gain control while brightness is low. The level of image signal is adjusted by an AGC (Auto Gain Control) circuit in a signal processing circuit 313 to be described later.

A timing generator 314 generates a driving control signal for the CCD 303 in accordance with the clock transmitted from a timing control circuit 202 in the camera body 2. The timing generator 314 generates clock signals such as a timing signal for indicating integration start/stop (that is, exposure start/stop) or control signals for reading out light receiving signal of each pixel (horizontal sync signal, vertical sync signal, or transfer signal) and output the clock signals to the CCD 303.

The signal processing circuit 313 applies predetermined analog-signal processing to the image signal (analog signal) output from the imaging circuit 302. The signal processing circuit 313 includes a CDS (correlative double sampling) circuit and an AGC circuit not shown, reduces noises of the image signal by the CDS circuit, and adjusts the level of the image signal by adjusting gain by the AGC circuit.

A light modulating circuit 304 controls the quantity of light emission from the built-in flash 5 during flash photography to a predetermined light emission quantity set by an overall control unit 211 in the camera body 2. In flash photography, flash light reflected from a subject is received by the light modulating sensor 305 simultaneously with start of exposure. When the received light quantity reaches a predetermined light emission quantity, a light-emission stop signal is output to a flash control circuit 214 in the camera body 2 from the light modulating circuit 304 through the overall control unit 211. The flash control circuit 214 forcibly stops the light emission from the built-in flash 5 in response to the light-emission stop signal and thereby, the quantity of light emission from the built-in flash 5 is controlled to a predetermined light emission quantity.

A zoom motor 307 for changing the zoom ratio of the zoom lens 301 and moving the lens between encased position and photo-taking position, an AF (Auto Focus) motor 308 for performing focusing, and a diaphragm actuator 309 for adjusting a diaphragm are located in the imaging unit 3.

Furthermore, a lens sensor 301a for detecting predetermined location of the zoom lens 301 by driving the zoom motor 307 is provided for the imaging unit 3 as a component for inspection of the digital camera 1 to be mentioned later.

Then, the internal configuration of the camera body 2 is described below.

The overall control unit 211 is mainly constituted of a CPU, which controls driving of each peripheral component in the above imaging unit 3 and the camera body 2, and controls the photographing operation of the digital camera 1. The unit 211 is connected with peripheral components by address, data, and control buses.

Flows of image data in FIG. 5 (and FIG. 6 to be described later) are shown by arrows between peripheral components. Actually, however, image data is sent to each peripheral component through the overall control unit 211. Therefore, a work RAM 211a comprising a DRAM and a flash ROM 211b for storing programs are built in the overall control unit 211.

Then, the configuration for processing an image signal in the camera body 2 and displaying an image are described below.

Figure 6:
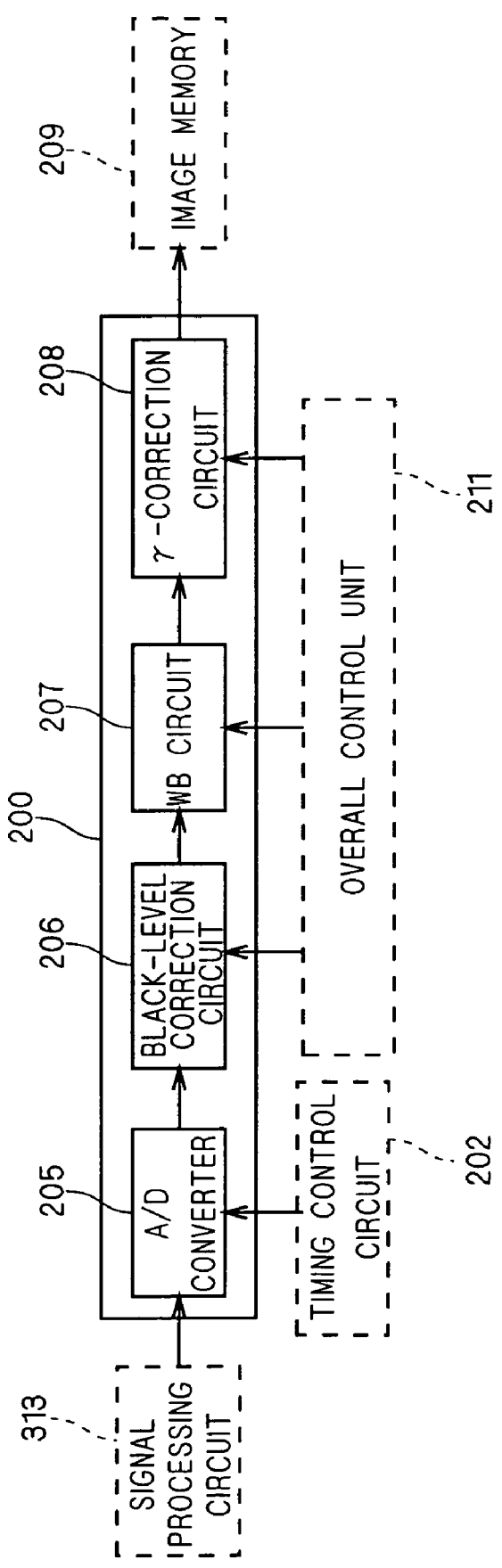
FIG. 6 is a block diagram showing an internal configuration of an image processing unit.

The analog image signal sent from the signal processing circuit 313 in the imaging unit 3 undergoes various image processing in an image processing unit 200 in the camera body 2. FIG. 6 is a block diagram showing a configuration of the image processing unit 200. First, the analog image signal sent to the image processing unit 200 is converted into a 10-bit digital signal of every pixel by an A/D converter 205. The A/D converter 205 converts each pixel signal (analog signal) into a 10-bit digital signal in accordance with the clock for A/D conversion input from the timing control circuit 202.

The timing control circuit 202 generates a reference clock and clocks for the timing generator 314 and the A/D converter 205 under the control by the overall control unit 211.

A black-level correction circuit 206 corrects the black level of the A/D-converted pixel signal (hereafter referred to as "pixel data") to a reference black level. A WB circuit 207 performs level conversion of pixel data of color components of R, G, and B and adjusts the white balance considering γ correction in the subsequent process. The white balance is adjusted by using a level conversion table (more precisely, the data in the table) input to the WB circuit from the overall control unit 211 and the conversion factor (gradient of a characteristic curve) of each color component in the level conversion table is determined to each captured image by the overall control unit 211.

A γ-correction circuit 208 corrects the γ characteristic of pixel data. The output of the γ-correction circuit 208 is sent to an image memory 209 as shown in FIGS. 5 and 6.

The image memory 209 is a memory for storing the pixel data output from the image processing unit 200 and has a storage capacity for one frame. That is, the image memory 209 has a storage capacity of pixel data for n×m pixels when the CCD 303 has pixels of n rows and m columns (n and m are natural numbers) arranged like a matrix so that each pixel data is stored in a corresponding storage area (address).

A VRAM 210 is a buffer memory for image data to be displayed on the LCD 10. The VRAM 210 has a storage capacity of image data corresponding to the number of pixels of the LCD 10.

According to the above configuration, during standby for taking pictures in the recording mode, each pixel data of images captured by the imaging unit 3 every predetermined interval is processed by the image processing unit 200, stored in the image memory 209, transferred to the VRAM 210 through the overall control unit 211, and displayed on the LCD 10 (live view display). Thereby, a user can visually recognize a subject through the image displayed on the LCD 10.

In the playback mode, predetermined signal processing by the overall control unit 211 is applied to the image read out of a memory card and then, the image is transferred to the VRAM 210 and displayed on the LCD 10. When the image is displayed on the LCD 10, a backlight 16 is turned on in accordance with the control by the overall control unit 211.

Then, other components in the camera body 2 are described below in order.

A card I/F 212 is an interface for transferring signals to and from various cards inserted in the card slots 17a and 17b. Specifically, the card I/F 212 writes or reads image data in or from a memory card or inputs or outputs image data or various signals from or to various function cards. As previously described, the digital camera 1 has two card slots and therefore, two cards can be set to the camera 1.

As described above, the flash control circuit 214 is a circuit for controlling light emission from the built-in flash 5. The flash control circuit 214 controls presence or absence of light emission, light emission quantity, and light emission timing of the built-in flash 5 and controls the light emission quantity of the built-in flash 5 in accordance with a light-emission stop signal from the light modulating circuit 304.

A clock circuit 219 is a circuit for managing the date and time of photographing, which is driven by a not-illustrated another power supply.

A zoom-motor driving circuit 215 and an AF-motor driving circuit 216 for driving the zoom motor 307 and the AF motor 308 are further provided for the camera body 2. These circuits function by operating an operating unit 250 corresponding to the shutter start button 8, other above-described various switches, and buttons.

For example, the shutter start button 8 is constituted as a two-stage switch capable of detecting a half-pressed state and a full-pressed state adopted for a camera for silver halide films. By half-pressing the shutter start button 8 during standby, distance information is input to the overall control unit 211 in accordance with the distance-measurement information supplied from the sensor 306. Moreover, the AF-motor driving circuit 216 drives the AF motor 308 in accordance with the designation from the overall control unit 211 to move the zoom lens 301 to a focused position.

When buttons 231 and 232 are pressed, signals from these buttons are sent to the overall control unit 211, the zoom-motor driving circuit 215 drives the zoom motor 307 to move the zoom lens in accordance with the designation from the overall control unit 211 and performs zooming.

Furthermore, a diaphragm driving circuit 217 for driving the diaphragm actuator 309 is also located in the camera body 2.

Power is supplied to the overall control unit 211 and peripheral components from a power-supply circuit 237, and the power-supply circuit 237 is supplied with power from the power battery 236 or an AC adapter through a DC input terminal 235. The power-supply circuit 237 connects with a voltage detection circuit 238 which operates when receiving a support described later. The voltage detection circuit 238 detects the inter-terminal voltage of each component (descent voltage in each component) while supplying power to each component in the digital camera 1. The detected voltage is input to the overall control unit 211.

Each component in the camera body 2 is described above. The overall control unit 211 performs various functions in addition to delivery of data with peripheral components and timing control through software.

For example, the overall control unit 211 has a brightness determining function and an exposure setting function for setting exposure control values (shutter speed and diaphragm value). The brightness determining function is for determining the brightness of a subject by using an image captured by the CCD 303 every ⅟30 sec and stored in the image memory 209. The exposure setting function is for setting the shutter speed (integration time in the CCD 303) and the diaphragm value in accordance with the determined result of the brightness of the subject through brightness determination.

Moreover, the overall control unit 211 has a filtering function, a recording image generating function, and a playback image generating function in order to record captured images.

The filtering function is for correcting a high-frequency component of an image to be recorded through a digital filter and correcting the image quality for contours.

The recording image generating function is for reading pixel data from the image memory 209 and generating a thumbnail image and a compressed image to be recorded in a memory card. Specifically, pixel data is read from the image memory 209 every 8 pixels in horizontal and vertical directions while performing scanning in the raster direction, sequentially transferred to the memory card, and thereby a thumbnail image is generated and recorded in the memory card. Moreover, when recording compressed image data in the memory card, all pixel data values are read from the image memory 209 and predetermined compression according to the JPEG format such as two-dimensional DCT conversion or Huffman encoding is applied to the image data, and the compressed image data is recorded in the memory card.

As specific operations, when photography is designated by the shutter start button 8 in the recording mode, a thumbnail image and a compressed image, which is compressed by the JPEG format at a compression rate set by a compression-rate setting switch, are generated from the image stored in the image memory 209, and these images are stored in the memory card together with the tag information for the captured image (frame number, exposure value, shutter speed, compression rate, photographed date and time, flash on/off data at photo taking, scene information, information for image determination result, and the like).

For example, compressed image data of 1,600×1,200 pixels and thumbnail image data of 80×60 pixels are recorded in the memory card. In this case, the capacity of image data for one frame is equal to approx. 1 MB. Moreover, an audio card is attached as a function card, audio data can be also recorded and therefore, link information to an audio file is recorded in the tag of the image file in the memory card.

The playback image generating function is for extending the compressed image data recorded in the memory card to generate a playback image. As specific operations, by setting the mode selection switch 14 to the playback mode, image data having the maximum frame number is read out of the memory card, extended, and transferred to the VRAM 10. Thereby, the image having the maximum frame number, that is, the image photographed close at hand is displayed on the LCD 10.

Furthermore, the overall control unit 211 has a function for self-inspecting the digital camera 1 when undergoing the support from the maker. The self-inspecting function of the digital camera 1 will be described later in detail.

<1.2 Support Through Inspection Card>

Then, a support system for properly diagnosing the digital camera 1 and reducing the support cost is described. The support system of the first preferred embodiment minimizes the unnecessary mailing (or unnecessary bring-in) of the digital camera 1 to a support division. An inspection card which is a flash memory card storing an inspection program for executing an inspection by the digital camera 1 is transferred between a user (a customer) and the support division and thereby, it is properly determined whether trouble of the digital camera 1 requires a special repair.

Figure 7:
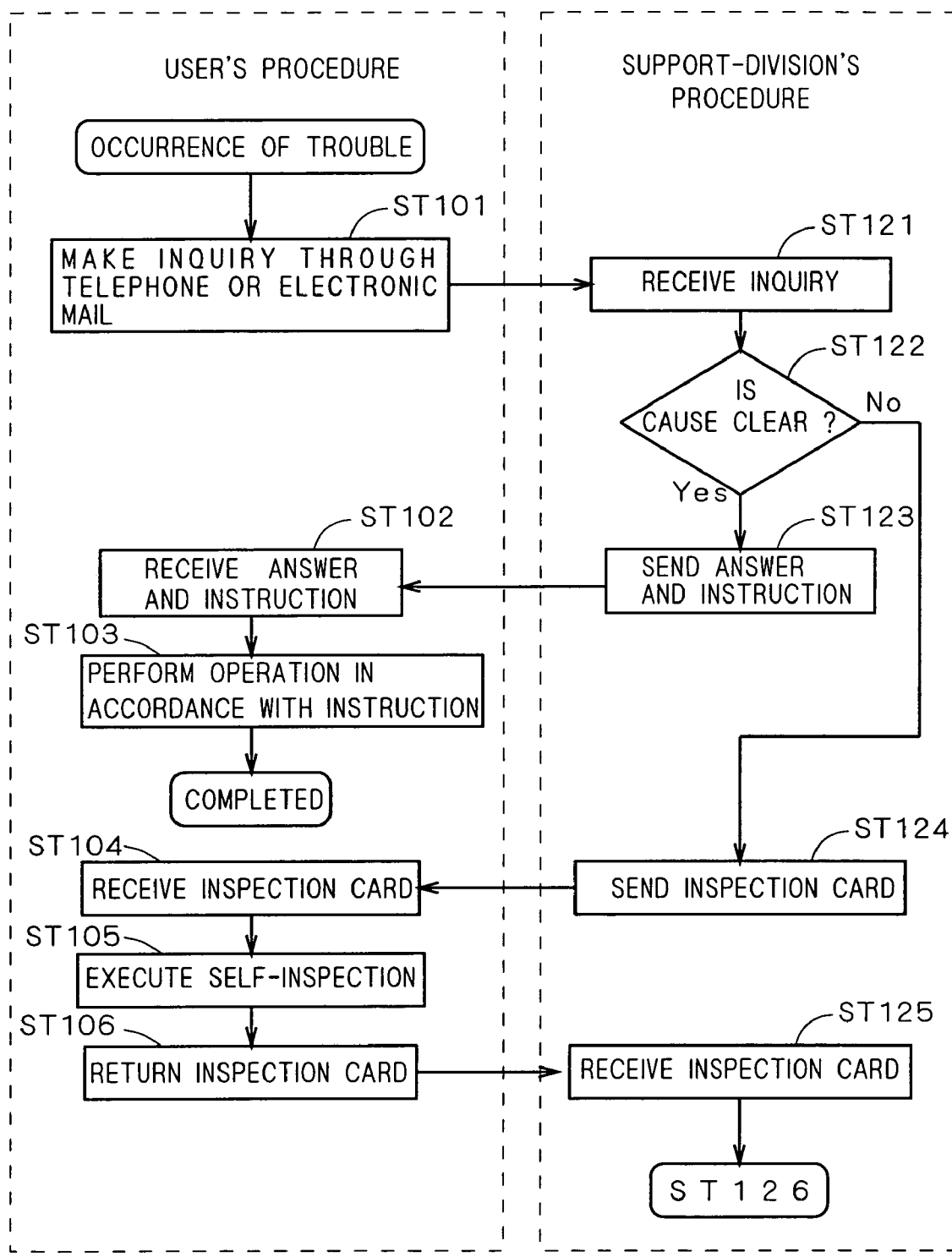
FIGS. 7 and 8 are flowcharts showing flows of procedures between the user and the support division in the first preferred embodiment.
Figure 8:
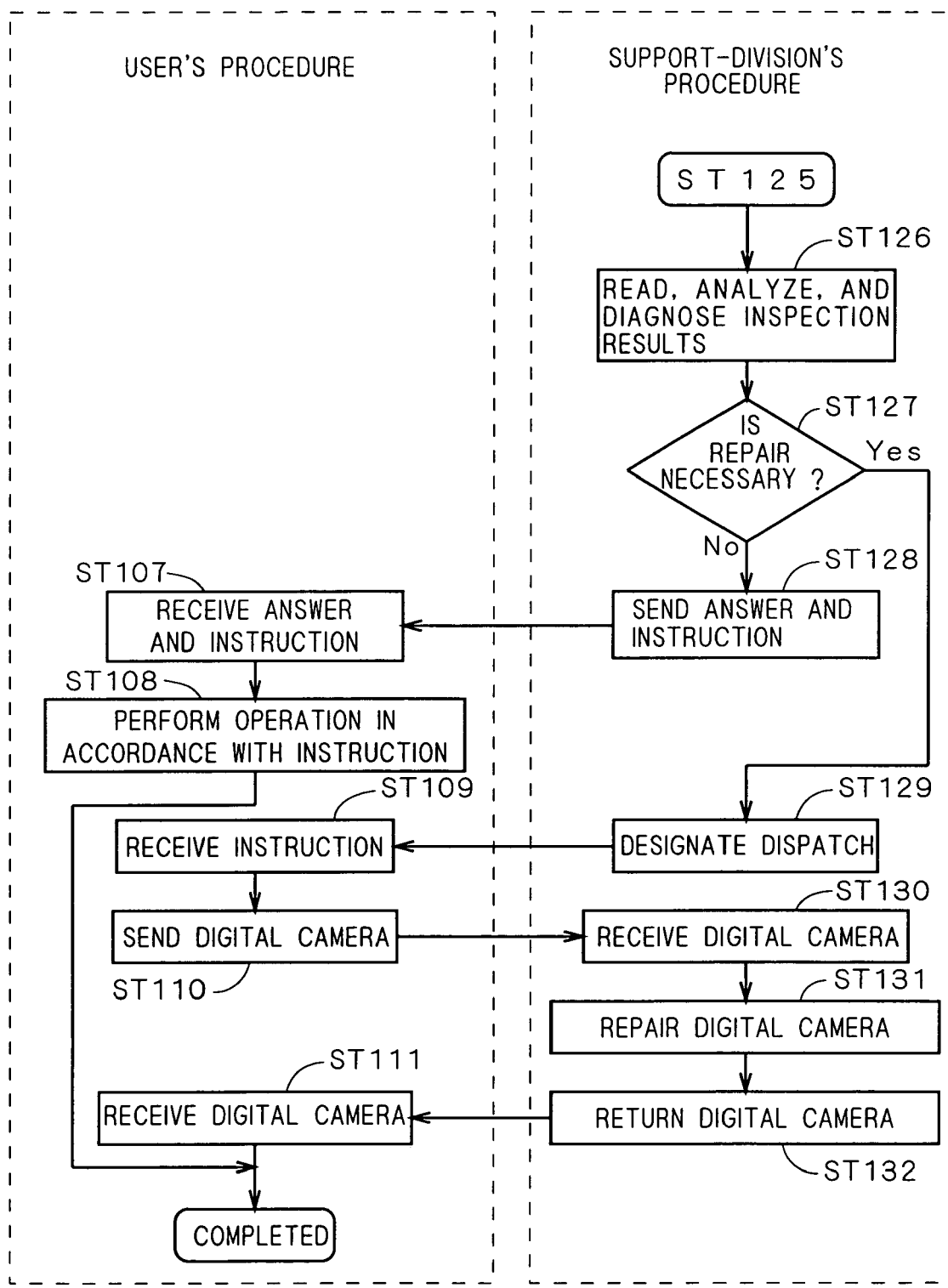

FIGS. 7 and 8 are flowcharts showing a flow of procedures between the user and the support division in the above support system.

First, when the user finds trouble while operating the digital camera 1, the user inquires of the support division about the trouble by using such means as telephone, FAX, or E-mail (step ST101). The support division receiving the inquiry determines whether the cause of the trouble is clear and whether they can accurately designate an action (steps ST121 and ST122).

When the cause is clear and the action is easy, the support division answers and designates the instruction to the user (steps ST123 and ST102). Thereby, the user settles the trouble by operating the digital camera 1 in accordance with the designation (step ST103).

When the cause is not easily specified, the support division prepares an inspection card which is a memory card storing an inspection program, and sends the inspection card and a return envelop to the user so that the user can inspect the digital camera 1 on the user's side (steps ST124 and ST104). Even if the cause is clear and repair is necessary, the inspection card is sent to the user as long as the user does not require an emergent repair, by considering the digital camera 1 may be unnecessarily transported.

The user receiving the inspection card inserts the inspection card in the card slot of the digital camera 1 and executes a self-inspection by the inspection program (step ST105). Operations of the digital camera 1 under self-inspection will be described later. By executing the self-inspection, inspection results are stored in the inspection card.

When the self-inspection is completed, the user returns the inspection card to the support division by the return envelope (steps ST106 and ST125). The support division receiving the inspection card reads out the inspection results from the inspection card and analyzing the results by a computer or an expert to diagnose the digital camera 1 (step ST126).

As a result of diagnosis, if the user can settle the trouble of the digital camera 1 to be supported, the support division sends the answer of the cause and the designation for instruction to the user (steps ST127, ST128, and ST107). Thereby, the user performs operations in accordance with the designation and the trouble of the digital camera 1 is properly settled (step ST108).

However, when it becomes clear that the trouble of the digital camera 1 cannot be settled by the user as a result of diagnosis, the support division instructs the user to mail the digital camera 1 to or bring the camera 1 into the support division (steps ST127, ST129, and ST109). If necessary, the support division sends packaging members for mailing to the user.

Then, the user packages the digital camera 1 and mails it to the support division (steps ST110 and ST130) and the support division repairs the digital camera 1 and returns it to the user (steps ST131, ST132, and ST111). Thereby, the trouble of the digital camera 1 is settled by repairing the camera 1.

As described above, the support system of the first preferred embodiment accurately determines whether repair by the support division is necessary by sending the inspection card to the user and receiving the inspection results through the inspection card. Thereby, it is possible to prevent the digital camera 1 from being sent to the support division while the cause of trouble is not specified, and the cost for support reduces.

<1.3 Operations of Digital Camera for Self-Inspection>

Then, a flow of operations of the digital camera 1 when the inspection program is executed on the user's side is described below.

Figure 9:
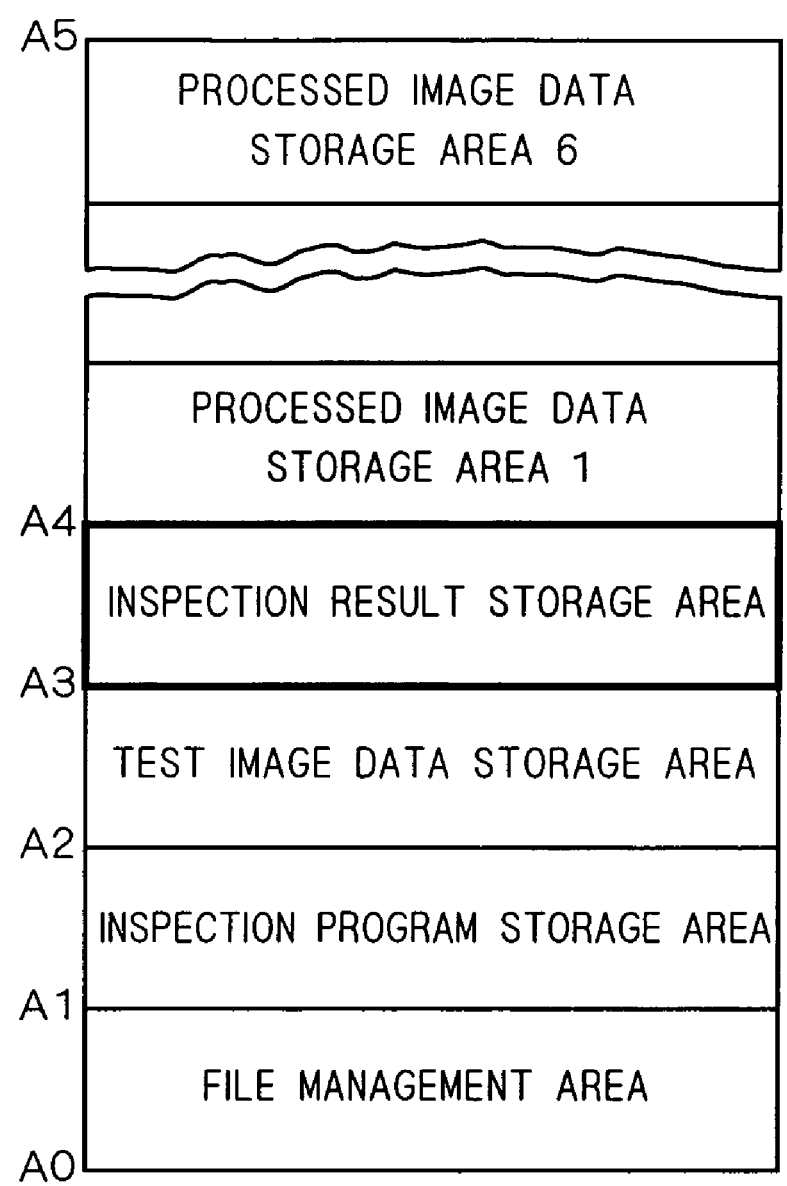
FIG. 9 is an illustration showing a structure of information in an inspection card.

FIG. 9 is an illustration showing a structure of the information stored in the inspection card which is a memory card. In FIG. 9, symbols A0 to A5 denote recording addresses in the inspection card. As shown in FIG. 9, the addresses A0 to A1 serve as a file management area and the inspection program for performing the self-inspection is stored in the addresses A1 to A2. The addresses A2 to A3 serve as an area for storing test image data for performing a self-inspection for image processing. When the inspection card is sent to the user from the support division, information is stored only in the addresses A0 to A3.

The addresses A3 to A4 serve as an area for storing results of a self-inspection other than the image-processing inspection and details of the structure of the area will be described later. The addresses A4 to A5 serve as an area for storing results of applying image processing to test image data. In this preferred embodiment, six types of image processing are performed, and processed image data blocks are stored in processed image data storage areas 1 to 6. Information is stored in the addresses A3 to A5 after the self-inspection and diagnosis of the digital camera 1 by the support division is performed through analyzing the inspection results stored in the addresses A3 to A5.

Figure 10:
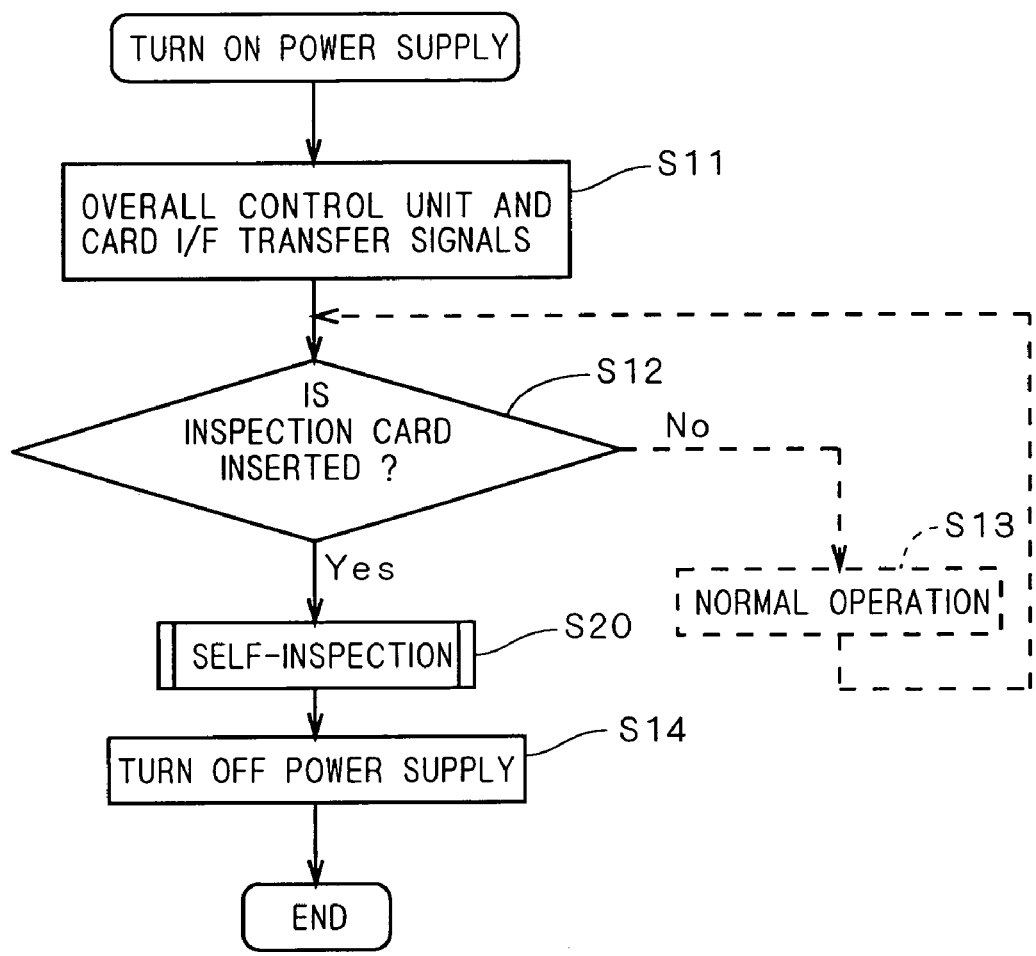
FIG. 10 is a flowchart showing general operations of the digital camera relative to the self-inspection.

FIG. 10 is a flowchart showing a flow of general operations of the digital camera 1, relative to the self-inspection, which performs the self-inspection by using the inspection card.

First, when the user presses the power-supply switch 227 of the digital camera 1 to turn on the power supply, signals are transferred between the overall control unit 211 and the card I/F 212 (step S11). Thereby, the digital camera 1 determines whether an inspection card is inserted in either of the card slots 17a and 17b (step S12). When no inspection card is detected, the digital camera 1 starts normal operations such as photo-taking and playback until the power-supply switch 227 is pressed again (step S13).

When an inspection card is inserted, the digital camera 1 reads out the inspection program from the inspection card to the work RAM 211a of the overall control unit 211 and the self-inspection is performed by executing the inspection program by components including the CPU (step S20). When the self-inspection is completed, the power supply is automatically turned off and the operation ends (step S14).

It is also allowed that the inspection card is inserted while the digital camera 1 performs the normal operation. In this case, the self-inspection is executed when the inspection card is inserted (steps S12 and S20) and thereafter, the power supply is automatically cut off (step S14).

Figure 11:
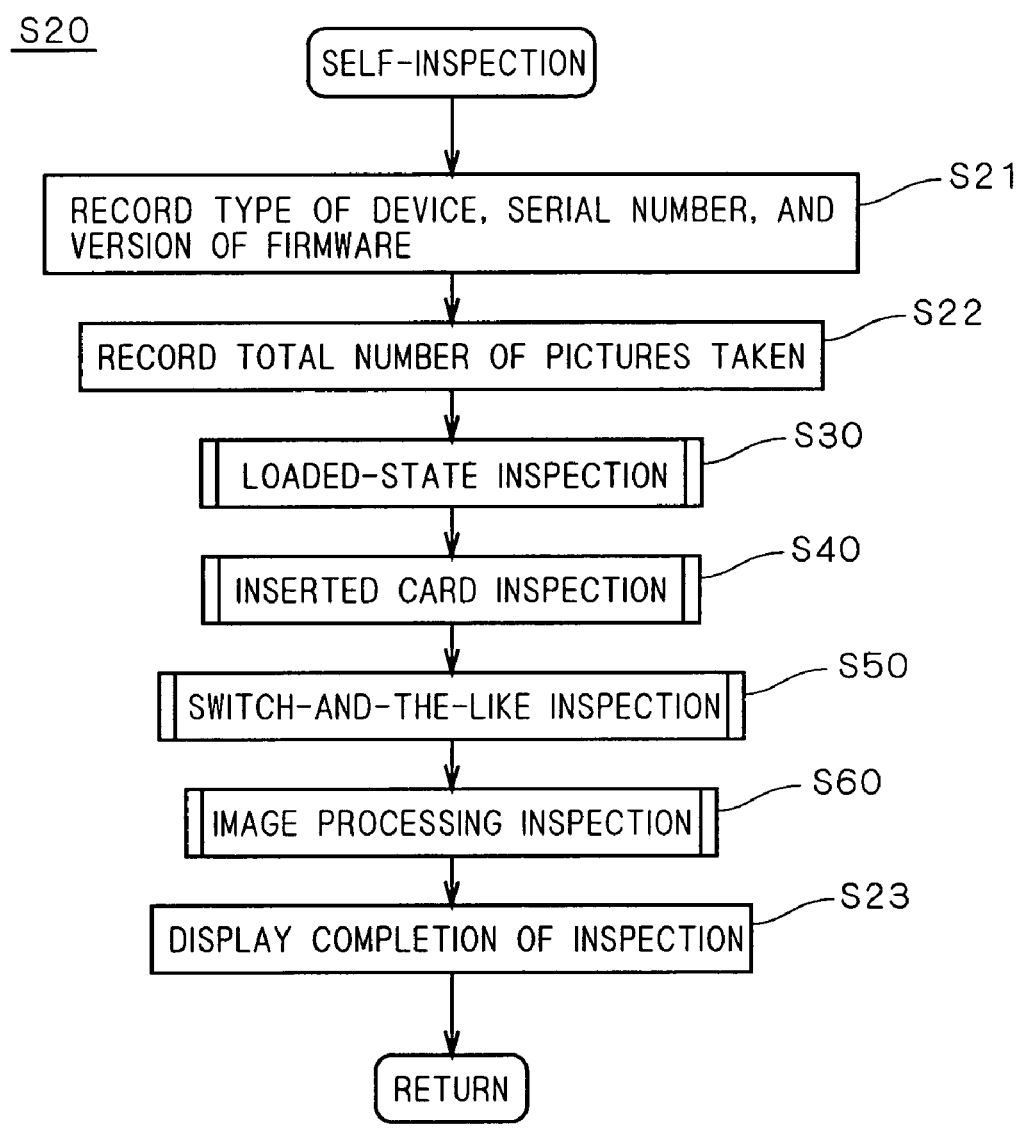
FIG. 11 is a flowchart showing a flow of operations of the digital camera under the self-inspection.

FIG. 11 is a flowchart showing a schematic flow of operations of the digital camera 1 in the self-inspection (step S20). In the self-inspection, the type and serial number of the digital camera 1 and the version of firmware serving as an operation program of the digital camera 1 are detected and these pieces of information are recorded in the inspection result storage area of the inspection card (step S21). Moreover, the total number of pictures taken since the digital camera 1 was manufactured is read out and recorded in the inspection card (step S22).

Then, a loaded-state inspection for detecting descent voltage in each component is performed by supplying power to each component in the digital camera 1 shown in FIG. 5 and inspection results are recorded in the inspection card (step S30). If an electronic card is inserted into an idle card slot, the electronic card is inspected (step S40) and switches and buttons of the digital camera 1 are inspected (step S50), and these inspection results are recorded in the inspection card.

Image processing of test image data is performed in order to diagnose whether trouble occurs in the image processing of the digital camera 1 and processed image data is stored in the inspection card (step S60).

Finally, it is temporarily displayed on the LCD 10 that the self-inspection is completed (step S23) and the power is turned off (step S14 in FIG. 10).

Figure 12:
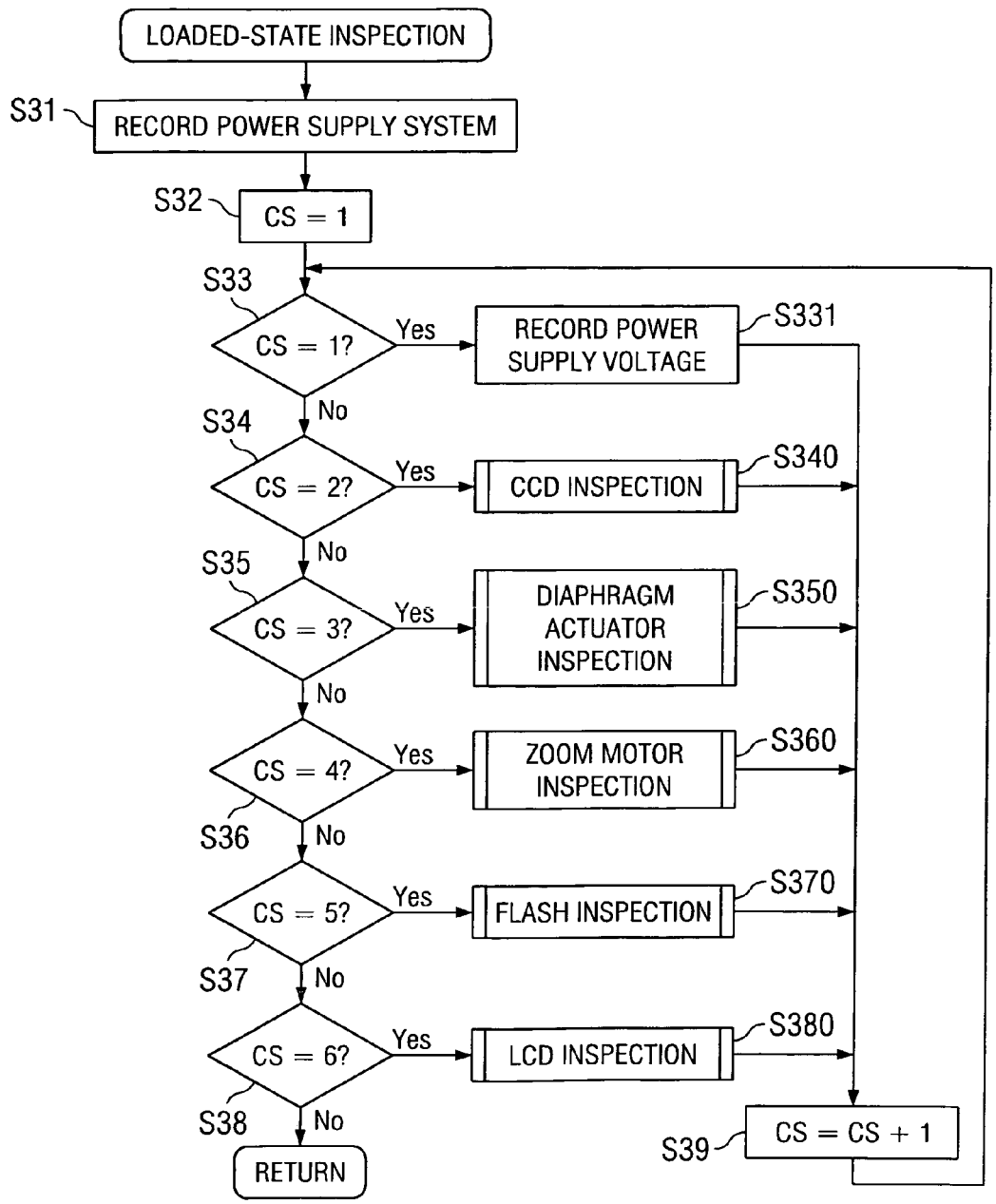
FIG. 12 is a flowchart showing a flow of operations of the digital camera under the loaded-state inspection.

FIG. 12 is a flow chart showing a flow of the processing for performing the loaded-state inspection in step S30. In the loaded-state inspection, it is first confirmed whether power is supplied to the digital camera from the power battery 236 or the AC adapter, and the confirmation result is recorded in the inspection card (step S31). Thereafter, a variable CS corresponding to the type of the inspection is initialized to 1 (step S32) and the inspection corresponding to the value of CS is sequentially performed while incrementing the variable CS (steps S331 to S380 and S39).

When the variable CS is equal to 1 (step S33), power-supply voltage is detected and recorded in the inspection card (step S331).

When the variable CS ranges between 2 and 6 (steps S34 to S38), power is supplied to the CCD 303, the diaphragm actuator 309, the zoom motor 307, the flash 5, and the LCD 10 and inspections are performed (steps S340, S350, S360, S370, and S380).

Figure 13:
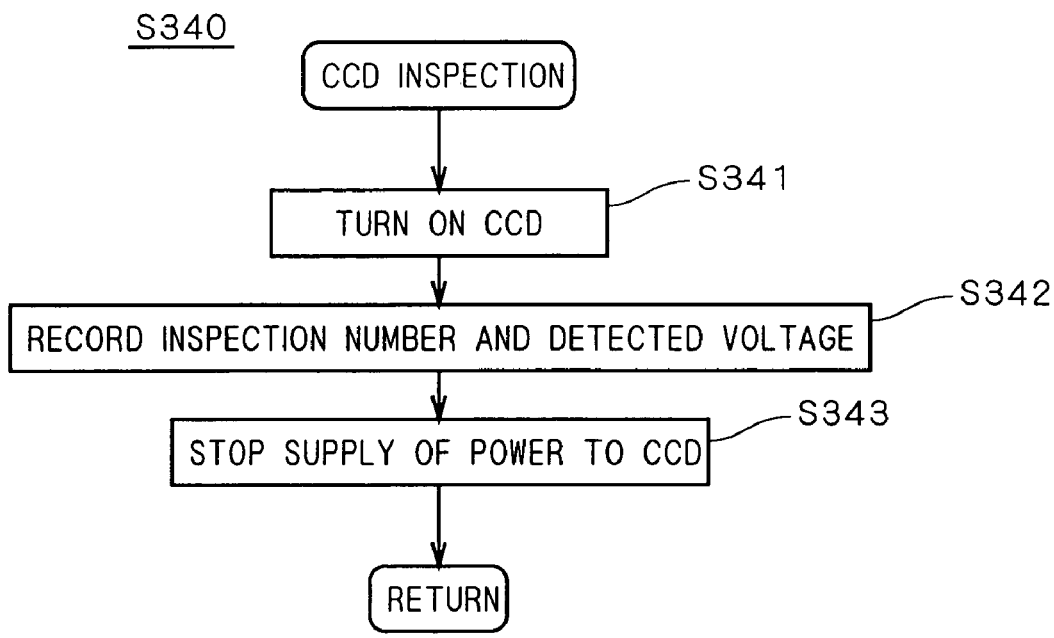
FIG. 13 is a flowchart showing a flow of operations of the digital camera under the CCD inspection.

FIG. 13 is a flowchart showing a flow of the CCD inspection in step S340. In the CCD inspection, power is supplied to the CCD 303 (step S341) and the voltage detection circuit 238 detects voltage between both terminals for supplying power to the CCD 303, and detected voltage is recorded in the inspection card (step S342). Thereafter, supply of power to the CCD 303 is stopped (step S343).

Figure 14:
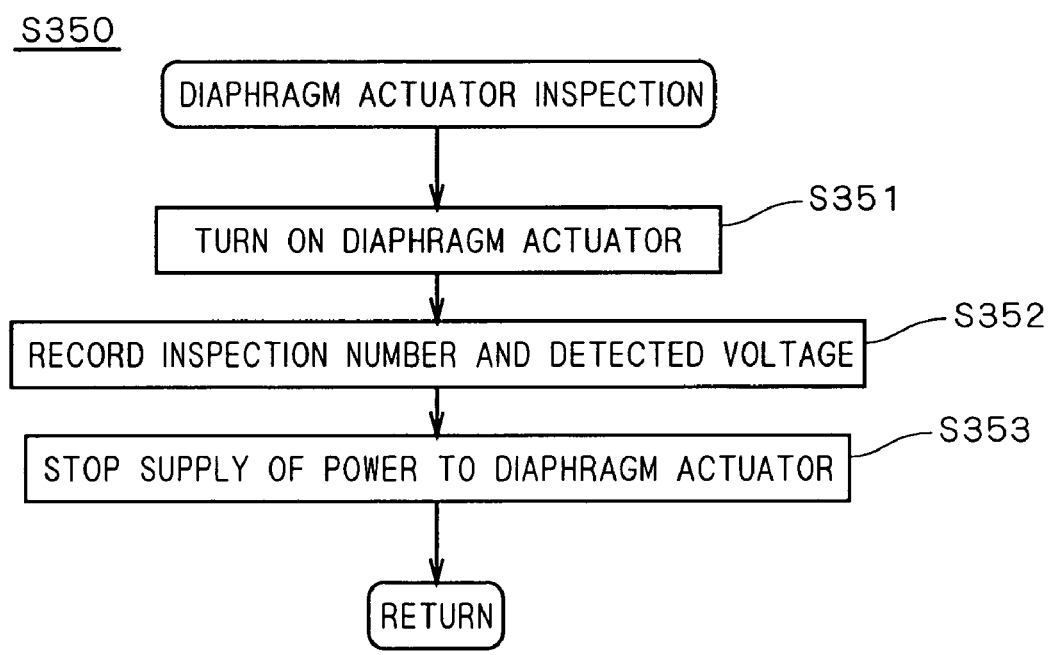
FIG. 14 is a flowchart showing a flow of operations of the digital camera under the diaphragm actuator inspection.

FIG. 14 is an illustration showing a flow of the diaphragm actuator inspection in step S350, which is the same processing as the case of the CCD inspection. That is, power is supplied to the diaphragm actuator 309 to detect and record the voltage supplied to the actuator 309 and then, supply of power is stopped (steps S351 to S353).

Figure 15:
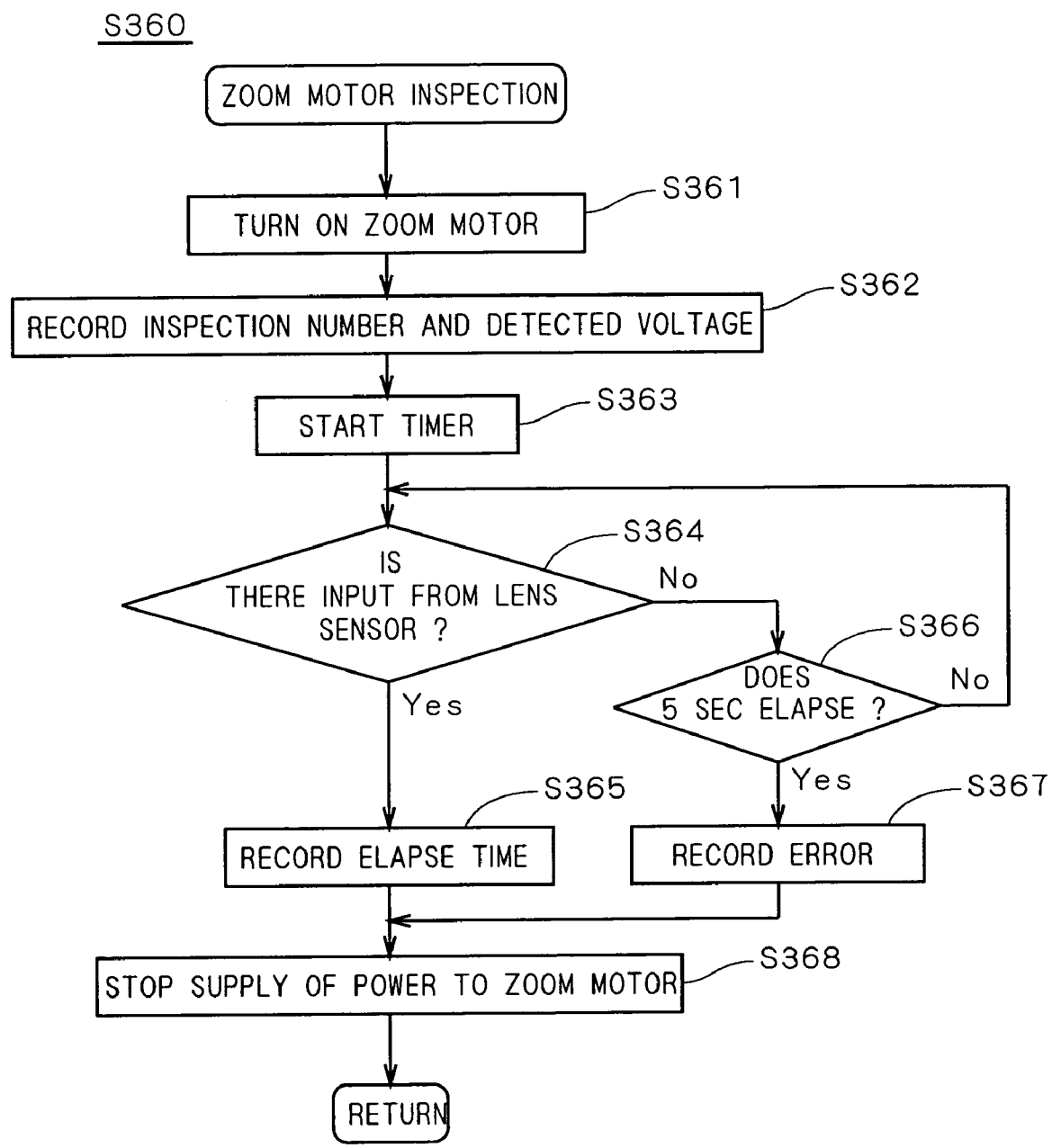
FIG. 15 is a flowchart showing a flow of operations of the digital camera under the zoom motor inspection.

FIG. 15 is a flowchart showing a flow of the zoom motor inspection in step S360. Also in the inspection of the zoom motor 307, power is first supplied to the zoom motor 307 (step S361) and the inspection number and detected voltage are recorded in the inspection card (step S362).

Thereafter, a timer is started (step S363) to wait for the lens sensor 301a to detect whether the lens moves to a predetermined position (step S364). When the lens sensor 301a outputs a detection signal, the elapse time is recorded in the inspection card (step S365). If the lens sensor 301a does not output the detection signal even after 5 seconds elapse, an error is recorded in the inspection card by assuming that the zoom motor 307 malfunctions (steps S366 and S367).

When the above operations are completed, supply of power to the zoom motor 307 is stopped (step S368).

FIG. 16 is a flowchart showing a flow of the flash inspection in step S370. First, charging of the flash power supply is started under control by the flash control circuit 214 (step S371). Then, a variable CFS serving as a flash state number corresponding to a state of the flash is set to 0 (step S372) and the variable CFS and voltage of the flash power supply detected by the voltage detection circuit 238 are recorded in the inspection card (step S373). Then, the variable CFS is incremented to wait for a predetermined time (steps S375 and S376).

By repeating steps S373, S375, and S376, detected voltage of the flash power supply is recorded every predetermined time. When the variable CFS reaches to 5, the flash 5 is emitted (steps S374 and S377) and the variable CFS and detected voltage of the flash power supply after flashing are recorded in the inspection card (step S378).

Figure 17:
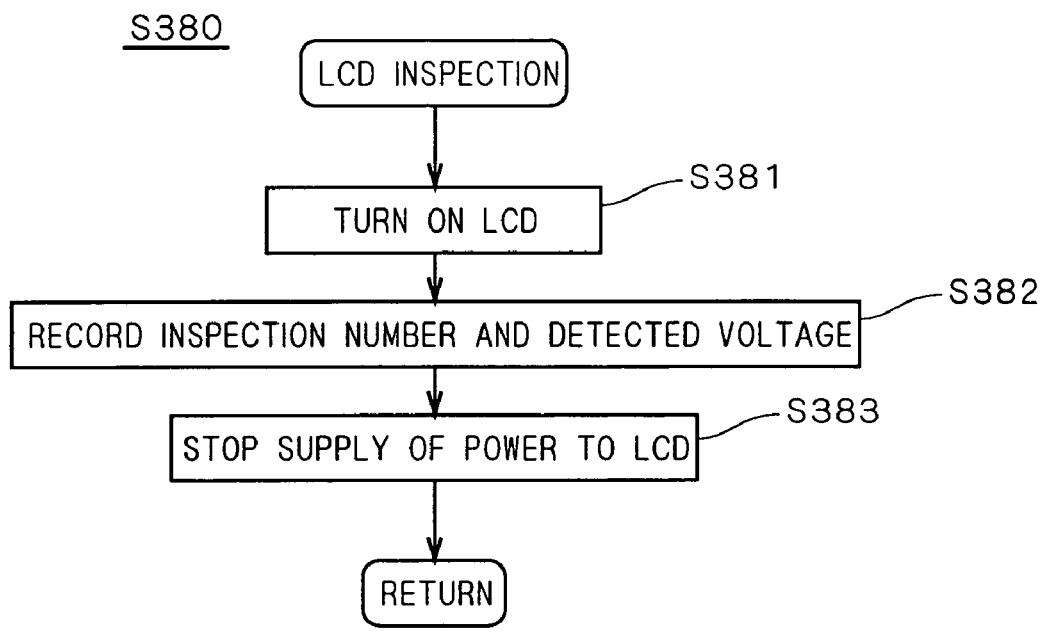
FIG. 17 is a flowchart showing a flow of operations of the digital camera under the LCD inspection.

FIG. 17 is a flowchart showing a flow of the LCD inspection in step S380. The processing of the inspection of the LCD 10 is the same as that of the inspection of the CCD 303. First, power is supplied to the LCD 10 (step S381), the inspection number and detected voltage are recorded in the inspection card, and supply of power is stopped (steps S382 and S383).

Figure 18:
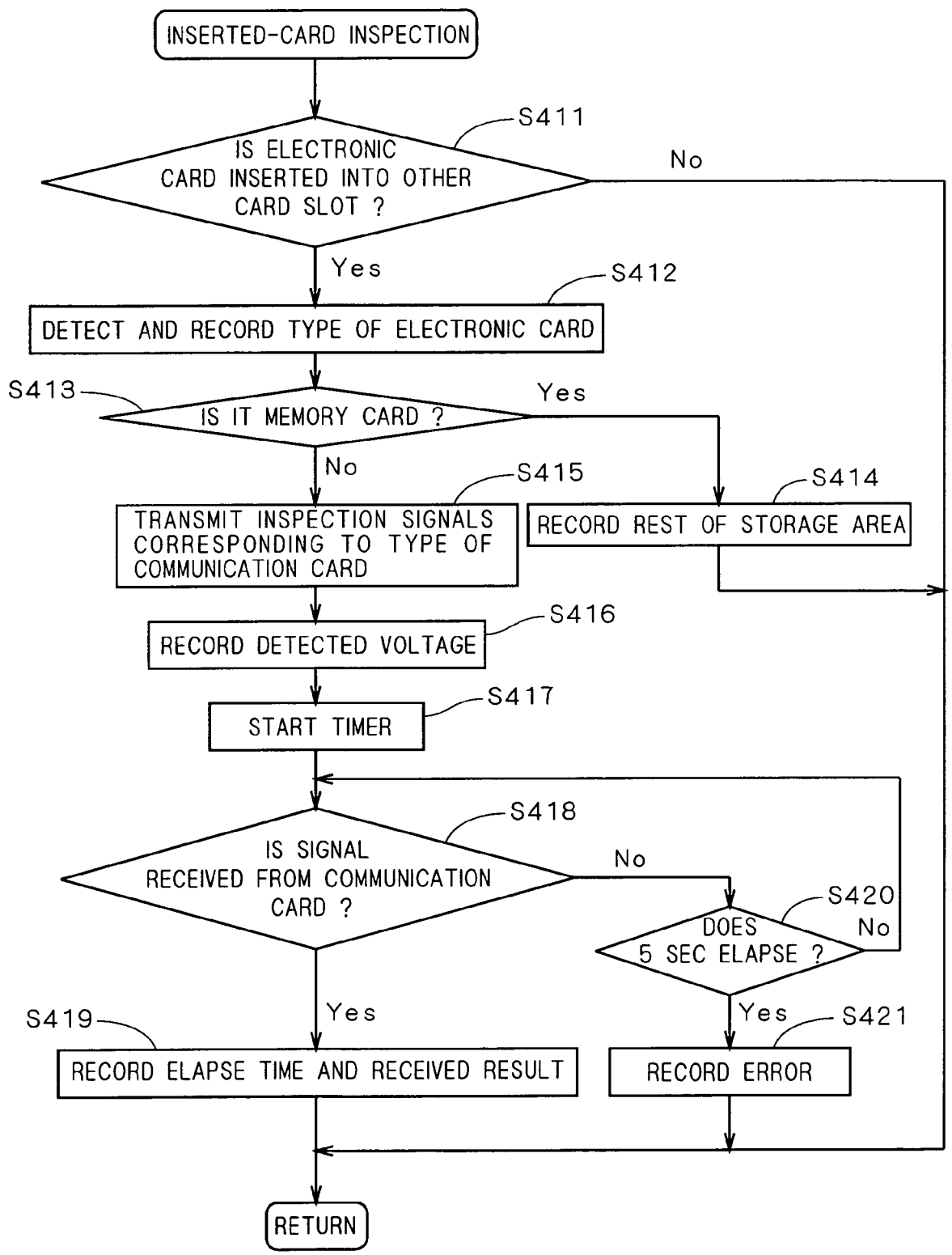
FIG. 18 is a flowchart showing a flow of operations of the digital camera under the inserted-card inspection.

Then, the inserted-card inspection shown in FIG. 18 (step S40) is described below. FIG. 18 is a flowchart showing a flow of operations of the digital camera 1 under inspection of the inserted card.

As shown in FIG. 4, the digital camera 1 has two card slots 17a and 17b and the inspection card which is a memory card is inserted into either card slot under self-inspection. Therefore, in the case of the inserted-card inspection, it is detected whether an electronic card such as a memory card or a function card is inserted into the other card slot (step S411). Unless any electronic card is inserted, the inserted-card inspection is not substantially performed, and the next inspection is started.

In the case where an electronic card is inserted into the other card slot, the type of the electronic card is detected and recorded in the inspection card (step S412). Then, it is confirmed whether the electronic card is a memory card (step S413). When the electronic card is a memory card, rest of the storage area of the card is recorded in the inspection card (step S414).

In the case where the inserted card is an electronic card (function card) other than a memory card, the inserted card is inspected by using inspection signals corresponding to the type of the electronic card. In the digital camera 1, a communication card having a communication function can be inserted. A flow of an inspection of the communication card is described below.

After the communication card is inserted into the card slot, inspection signals corresponding to the type of the communication card is transmitted (step S415). Almost simultaneously with transmission of the inspection signal, voltage supplied to the communication card is detected and recorded in the inspection card (step S416) and a timer starts (step S417). Thereafter, it is waiting for signals corresponding to the inspection signals to be transmitted from the communication card (step S418).

When the signal is received from the communication card, elapse time since transmission and a received result are recorded in the inspection card (step S419). If no received result is obtained even after 5 seconds elapse since transmission, an error is recorded in the inspection card by assuming that the communication card has trouble (steps S420 and S421).

Figure 19:
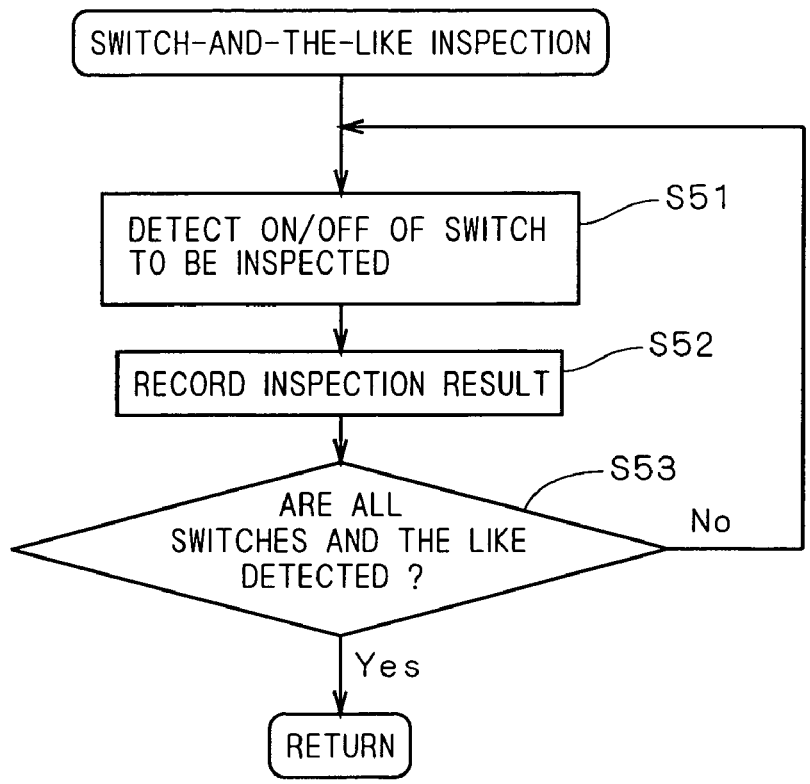
FIG. 19 is a flowchart showing a flow of operations of the digital camera under the switch-and-the-like inspection.

FIG. 19 is a flowchart showing a flow of the switch-and-the-like inspection (step S50) in FIG. 11. In the switch-and-the-like (including switches and buttons, and hereafter referred to as merely "switch") inspection, on/off state of a switch to be inspected is detected and recorded in the inspection card (steps S51 and S52). Then, by changing switches to be inspected in order, inspection results of all switches are recorded (step S53).

Figure 20:
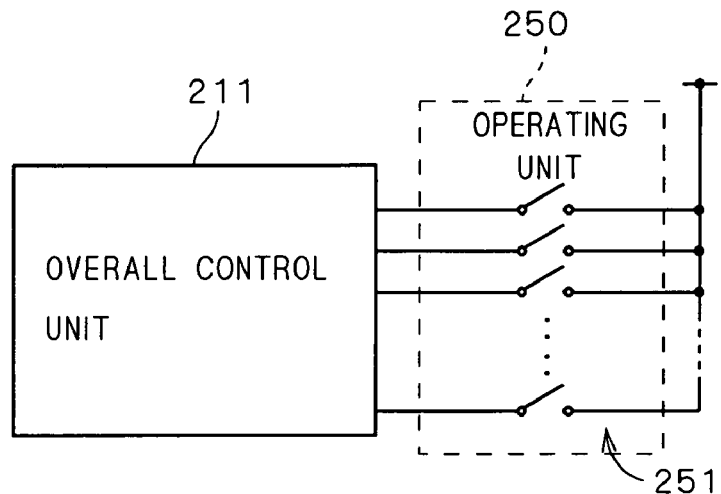
FIG. 20 is a block diagram showing the connective relation between the overall control unit and the operating unit.

As shown in FIG. 20, each switch 251 in the operating unit 250 is turned off when no operation is performed (it is also allowed that each switch 251 is turned on but a case in which each switch is turned off is described for convenience' sake). One end of each switch 251 is set to a potential "HI" and the other end of each switch 251 is connected to the overall control unit 211. Thereby, if any switch is short-circuited, it is recorded in the inspection card that the switch is turned on.

Figure 21:
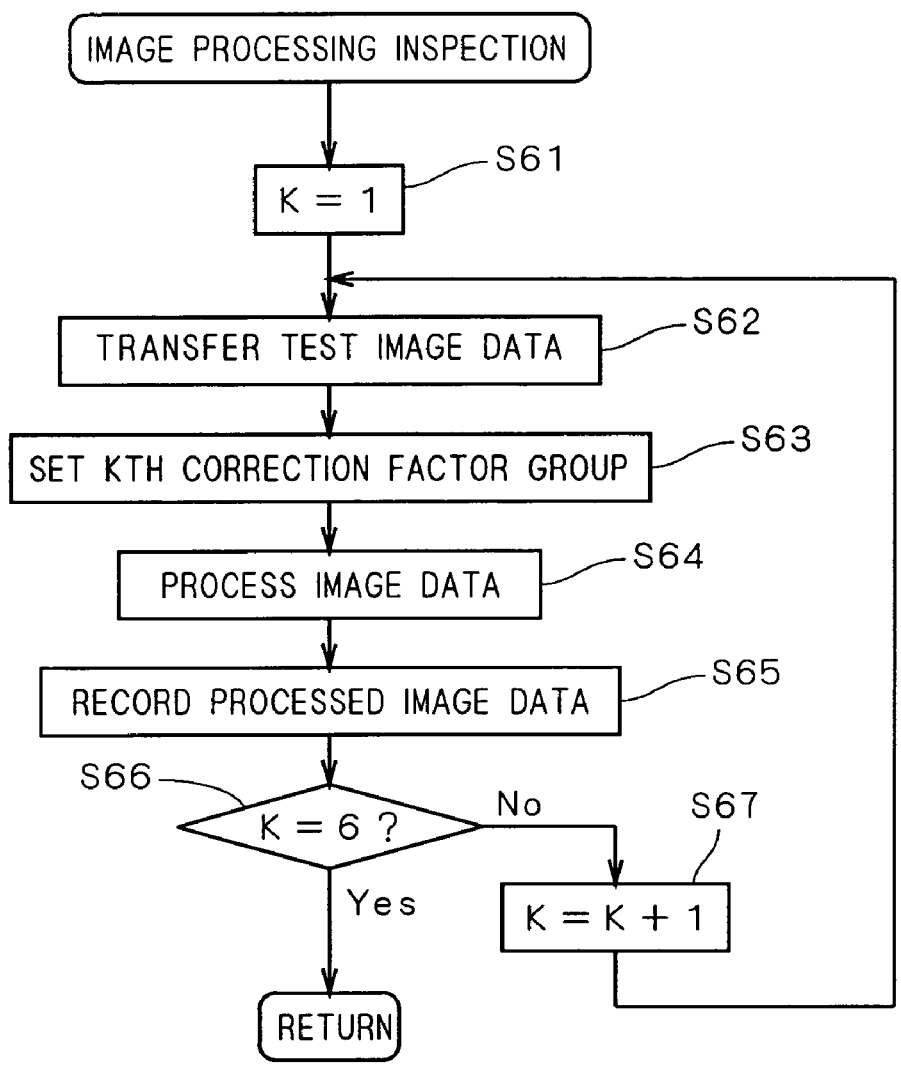
FIG. 21 is a flowchart showing a flow of operations of the digital camera under the image processing inspection.

FIG. 21 is a flowchart showing a flow of the image processing inspection (step S60) in FIG. 11. In the image processing inspection, a variable K showing a processing number is initialized to 1 (step S61). Then, the test image data stored in the test image data storage area (refer to FIG. 9) in the inspection card is transferred to the work RAM 211a (step S62) and the Kth correction factor group is set in the overall control unit 211 (step S63). The correction factor group includes black-level correction factors, WB correction factors, and γ correction factors used for image processing by the black-level correction circuit 206, the WB circuit 207, and the γ correction circuit 208 in the image processing unit 200 shown in FIG. 6.

The digital camera 1 applies image processing to the test image data by using the Kth correction factor group (step S64) and records processed image data in the processed image data storage area in the inspection card (step S65). Thereafter, 6 types of image processing results are recorded in the inspection card by incrementing the variable K and repeating image processing while changing correction factor groups (steps S66 and S67).

Figure 22:
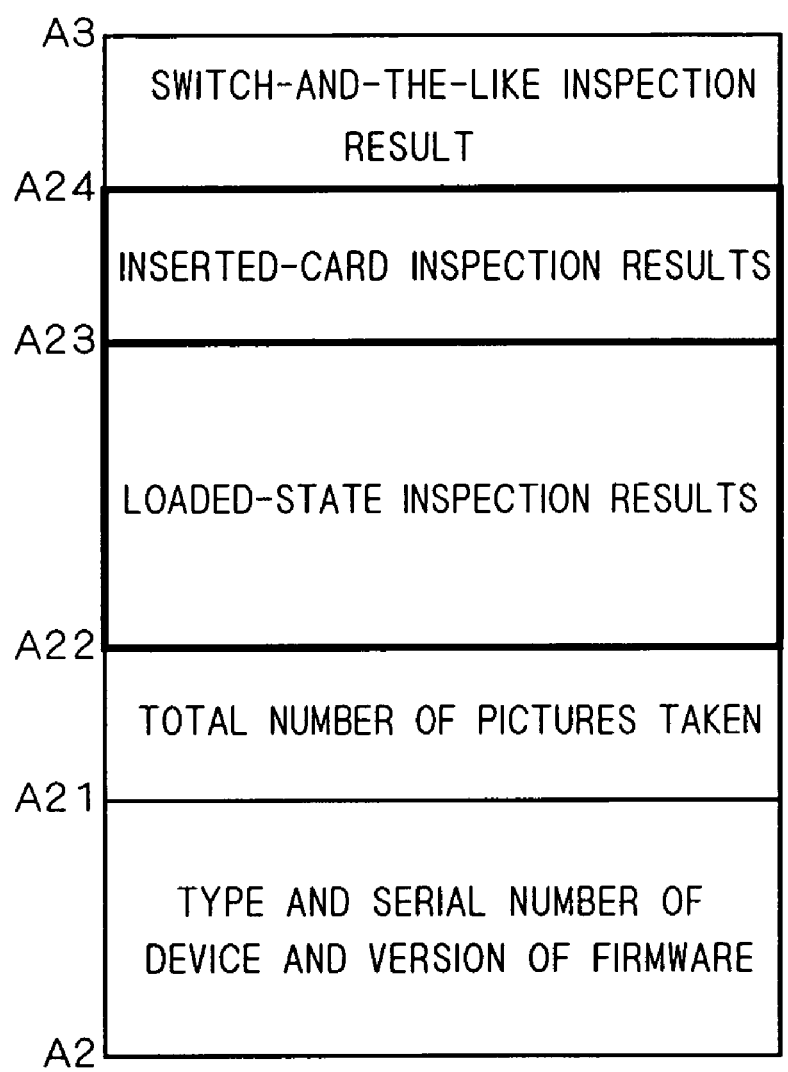
FIG. 22 is an illustration showing a structure of information in the inspection-result storage area in the inspection card.

FIG. 22 is an illustration showing a structure of the information stored in the inspection result storage area (refer to FIG. 9) in the inspection card after the above self-inspecting operations. Basic information is stored in addresses A2 to A22 and results of the loaded-state inspection (step S30), the inserted-card inspection (step S40), and the switch-and-the-like inspection (step S50) are stored in the addresses A22 to A23, A23 to A24, and A24 to A3 in order.

Figure 23:
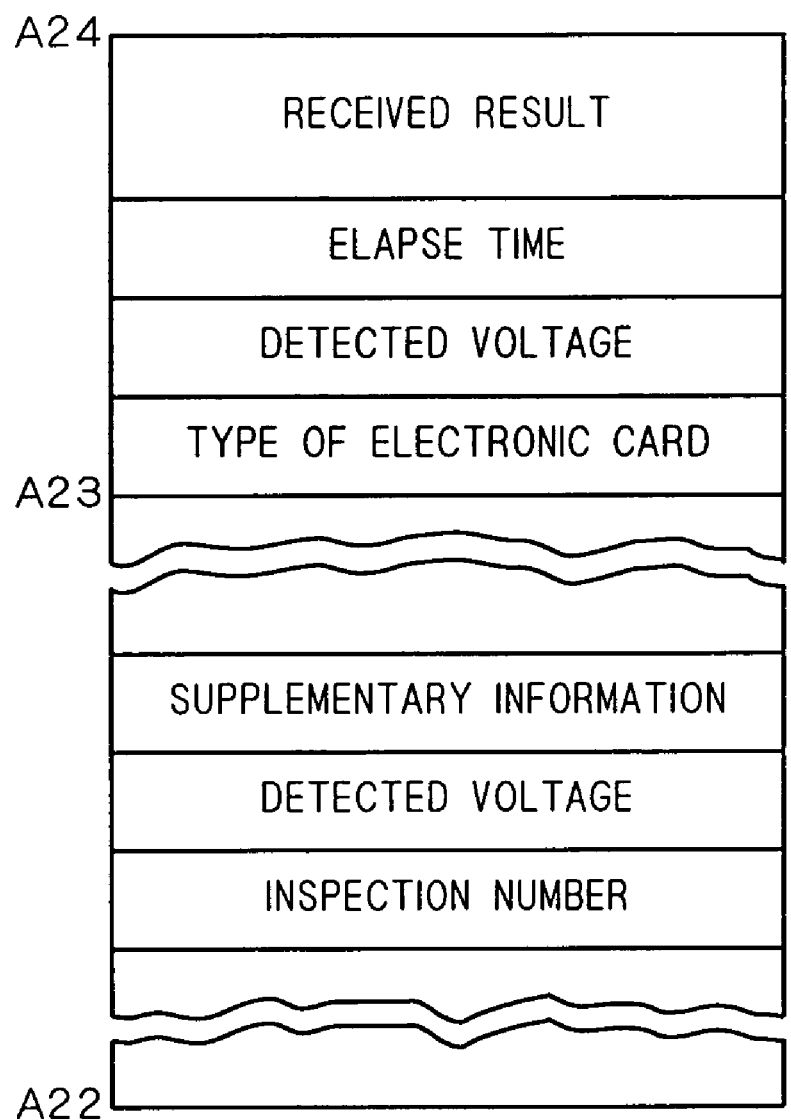
FIG. 23 is an illustration showing a structure of information for the loaded-state inspection results and the inserted-card inspection result in the inspection-result storage area.

FIG. 23 is an illustration showing a structure of the results of the loaded-state inspection and inserted-card inspection, in which the detected voltage of each component in the digital camera 1 is stored as a result of the loaded-state inspection together with the inspection number. In the case of the zoom motor inspection and the flash inspection, other supplementary information is also stored.

The type of the electronic card, detected voltage, elapse time, and received result are stored as results of the inserted-card inspection. Moreover, if the inserted electronic card is a memory card, the type and rest of storage area in the electronic card are stored.

<1.4 Diagnosis>

Figure 24:
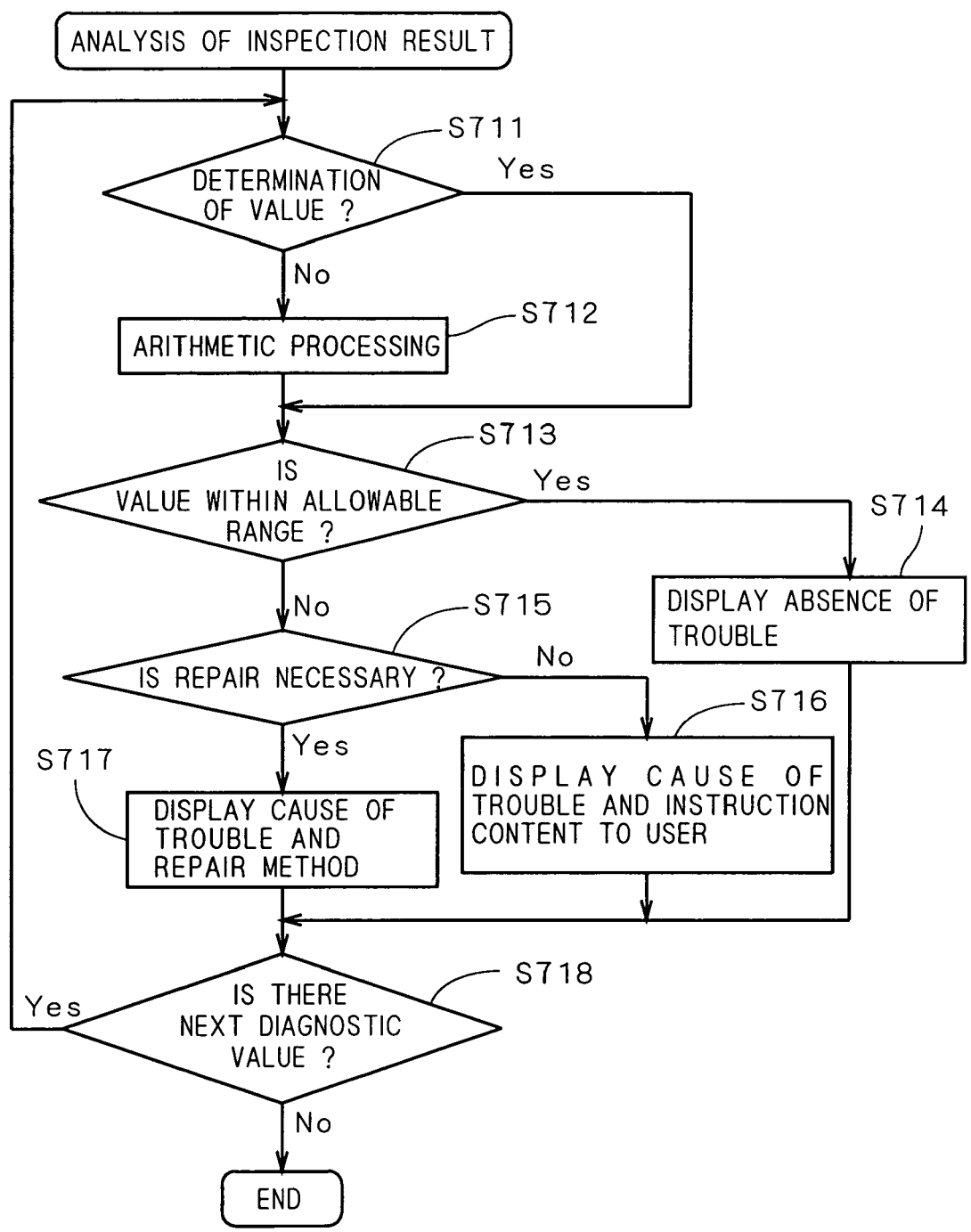
FIG. 24 is a flowchart showing a flow of analysis of the inspection results by the support division.

Then, diagnosis performed on a computer by the support division in accordance with the inspection results (step ST126 in FIG. 8) after the inspection card storing inspection results are returned to the support division, is described below by referring to FIG. 24. It is also allowed for an expert to analyze the inspection results, and in this case, the expert checks the inspection results and diagnose whether repair is necessary or not.

When the digital camera 1 is diagnosed by analyzing inspection results with a computer, whether repair is necessary is principally determined in accordance with whether a diagnostic value obtained from inspection results is within an allowable range.

Therefore, in the case of a diagnostic value which is included in the inspection results and directly diagnosed (e.g. detected voltage of power supply or on/off state of switch), it is determined whether the value is within a predetermined allowable range in the data base (or the value is equal to a predetermined value) (steps S711 and S713).

Information included in the inspection results which are not directly diagnosed (such as error records, transition state of charging of flash power supply, and received results from the electronic card) are processed while referring to the data base to obtain a diagnosis value (step S712). Thereafter, it is determined whether the value is within a predetermined allowable range (step S713).

When the diagnosis value obtained from the inspection results is within an allowable range, it is indicated on the display of the computer that no trouble is found in the diagnosis of the value (step S714). When the value is out of the allowable range, it is determined whether the trouble can be settled by the user or repair is necessary because it cannot be settled by the user (step S715).

If the trouble can be settled by the user, the cause of the trouble and the content to be designated for the user are indicated on the display (step S716). If the trouble cannot be settled by the user, the cause of the trouble and the repair method are displayed (step S717).

After the judgment of a diagnostic value obtained from the inspection results, the next diagnostic value obtained from the inspection results is similarly judged (step S718). Thereby, it is indicated in order on the display of the computer of the support division that no trouble is found, trouble not requiring repair is found, or trouble requiring repair is found.

According to the above analysis, it is synthetically diagnosed by the support division that the digital camera 1 present at hand of the user is normal, the camera 1 has trouble but needs no repair, or the camera 1 must be repaired. That is, when it is determined in accordance with any diagnostic value that the digital camera 1 must be repaired, it is necessary to send the camera 1 to the support division. When it is determined that the camera 1 needs no repair on any diagnostic value, it is unnecessary to send the camera 1.

Moreover, in the case where the camera 1 needs no repair but trouble which can be settled by the user is found on at least one diagnostic value, it is enough to communicate the settlement method indicated on the display to the user. However, in the case where no trouble of the camera 1 is found on any diagnostic value, the trouble of the digital camera 1 is assumed to be a misjudgment of the user.

1.5 SUMMARY

As described above, in the support system for diagnosing the digital camera 1 on the user's side through the inspection card, the digital camera 1 on the user's side can be properly diagnosed by the support division. It is possible to prevent the digital camera 1 from being unnecessarily sent to the support division. Thereby, the cost for support reduces. Moreover, the digital camera 1 can be quickly and properly diagnosed independently of change of setting of the camera 1 by the user. The load of the support division reduces and it is possible to quickly support a high-functional complicated electronic device such as a digital camera in accordance with a request from the user.

For example, when the user misjudges that the camera 1 has trouble but the rest of power in the battery or the rest of area in the memory is insufficient, it is possible to prevent the digital camera 1 from being erroneously sent to the support division. On the other hand, if a switch of the camera 1 is broken down, it is possible to instruct the user to immediately send the camera 1 to the support division.

The inspection program is stored in the inspection card and therefore it is unnecessary to store the inspection program in the digital camera 1 and thus, the program in the digital camera 1 is prevented from becoming larger. Even when the version of the firmware in the digital camera 1 is upgraded on occasion, updating the inspection program is easy and it is possible to perform proper diagnosis.

A memory card is used as an inspection card, it is possible to use the card slot originally provided for the digital camera 1 and thereby, a complex procedure or exclusive configuration is not requested in order to perform the self-inspection. Furthermore, it is possible for the user to easily manage the inspection results because the inspection results are stored in the sent inspection card.

The inspection program includes a program for inspecting an electronic card inserted into other card slot, and therefore it is possible to properly diagnose the digital camera 1 improved in function by the electronic card.

Furthermore, it is possible to quantitatively diagnose the doubt of the user that the image processing result is somehow strange because the test results of image processing are stored in the inspection card.

2. Second Preferred Embodiment

In the case of the first preferred embodiment, accurate determination in support is realized by transferring the inspection card which is a memory card between the user and the support division. In the support system of the second preferred embodiment, further quick support is realized by using computer communication in a computer network such as Internet.

Figure 25:
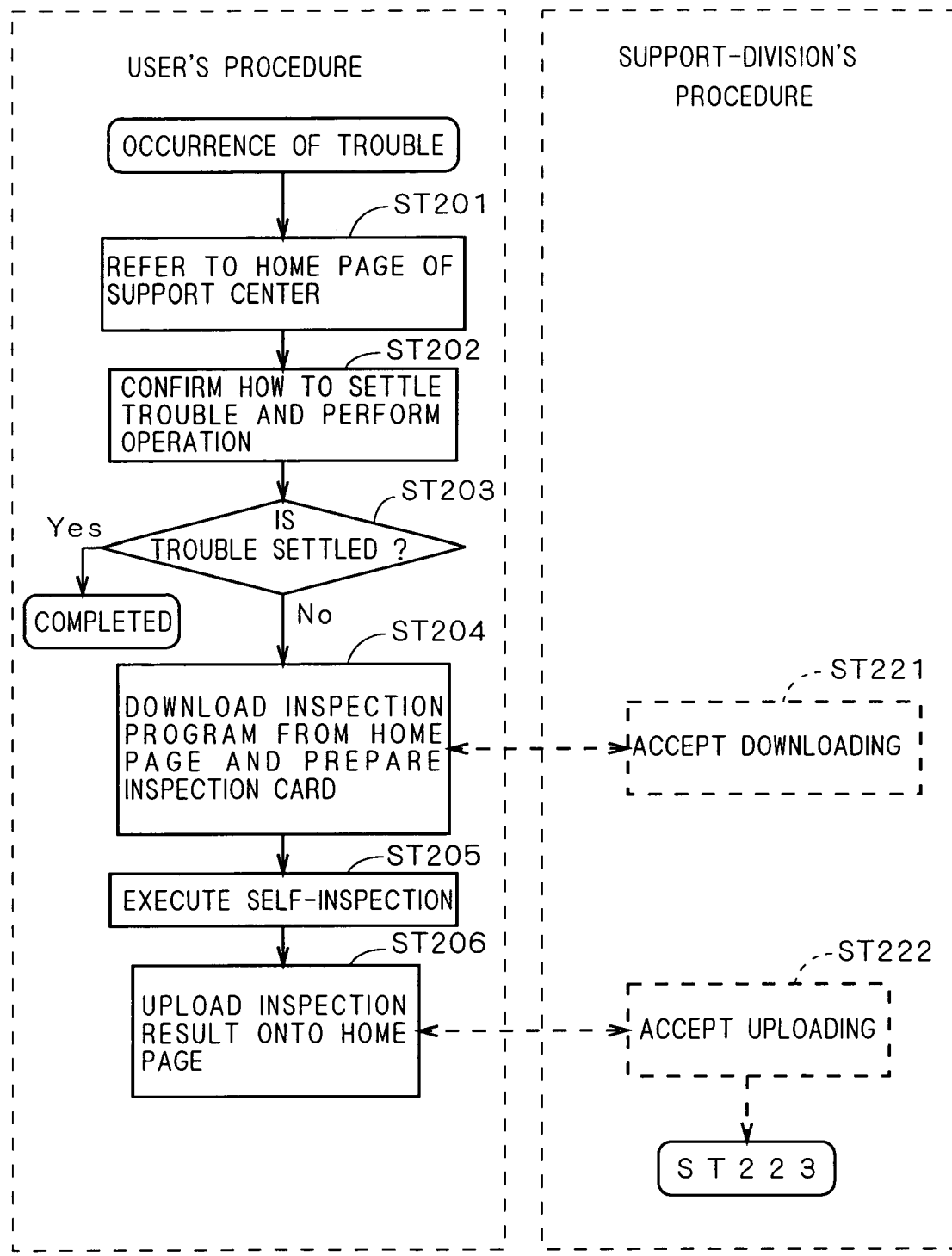
FIGS. 25 and 26 are flowcharts showing a flow of procedures between the user and the support division (support center) in the second preferred embodiment.
Figure 26:
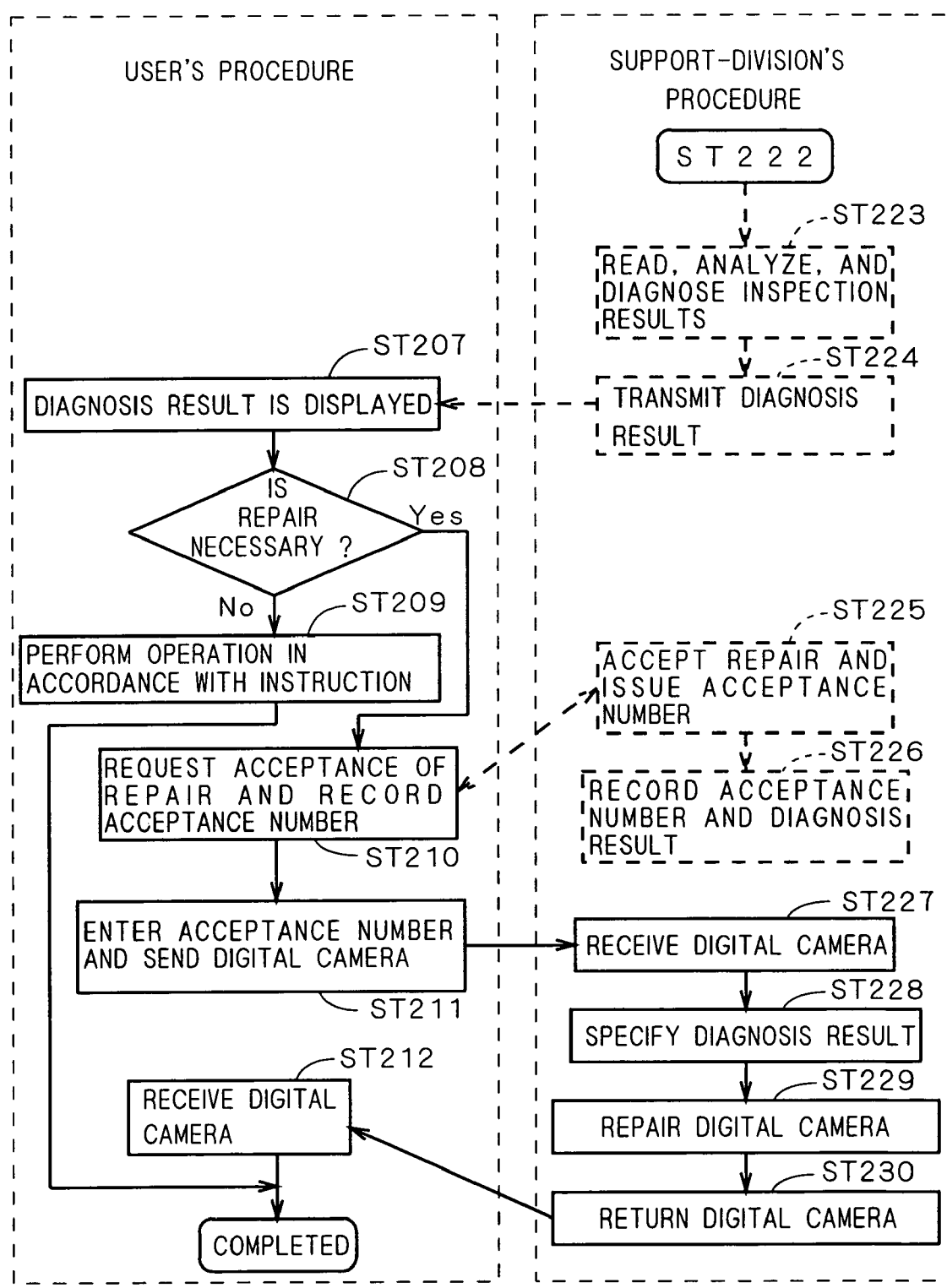

FIGS. 25 and 26 are flowcharts respectively showing a flow of procedures performed between the user and the support division for support in the second preferred embodiment. In FIGS. 25 and 26, each block enclosed by a broken line shows the procedure by the support division, which is performed by a computer serving as a Web server connected to a network. Also in the following description, it is assumed that an electronic device to be supported is the digital camera 1 having the structure shown in FIGS. 1 to 6 in the first preferred embodiment.

Before describing the flow of procedures between the user and the support division in the second preferred embodiment, the configuration for realizing the procedures is described below.

Figure 27:
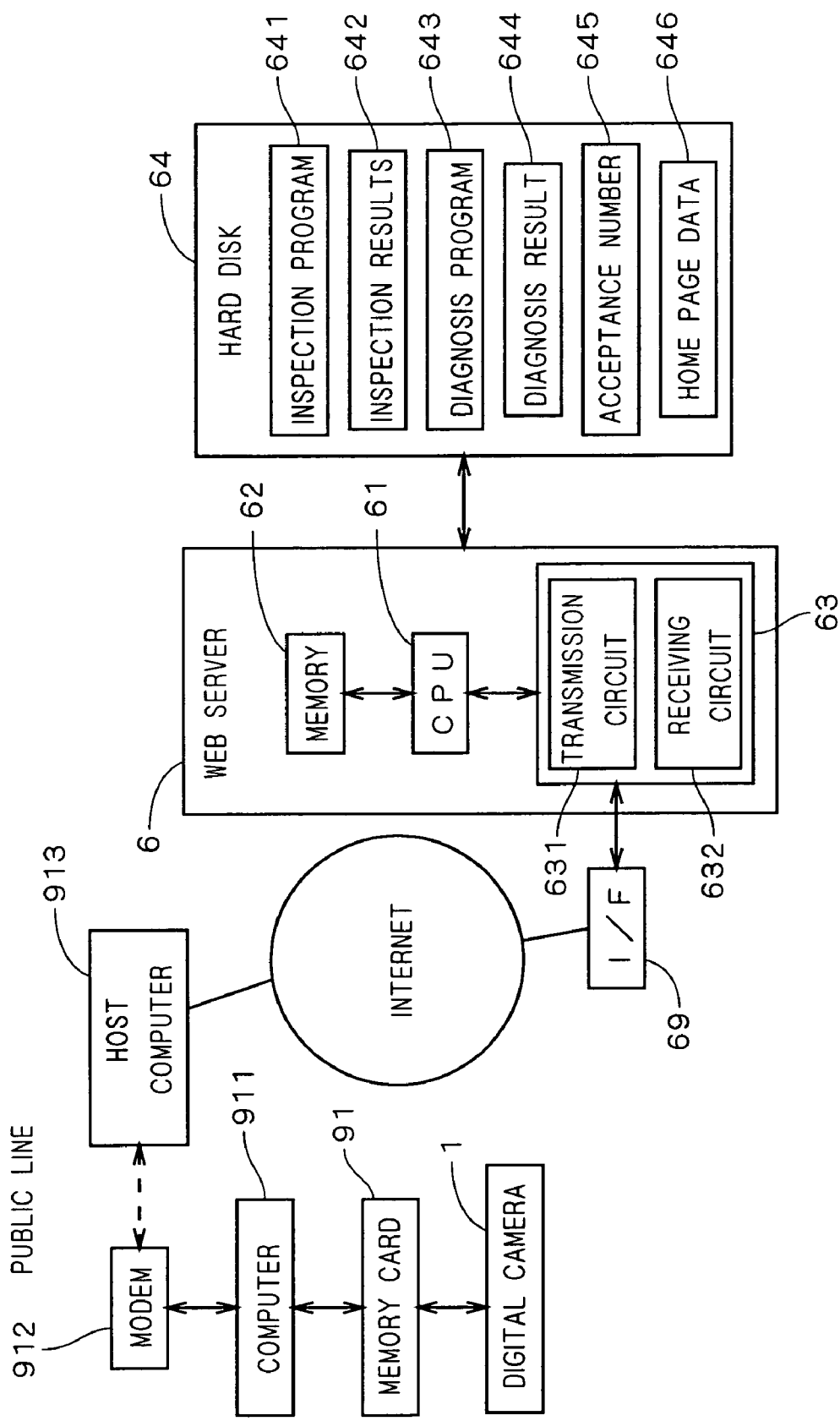
FIG. 27 is a block diagram showing the connective relation between user's computer and Web server in the second preferred embodiment.

FIG. 27 is an illustration showing the connective relation between a computer 911 of the user and a Web server 6 of the support division for realizing the procedures shown in FIGS. 25 and 26 and showing the internal configuration of the Web server 6.

FIG. 27 shows a general configuration for using the Internet, and the user's computer 911 accesses to a host computer 913 connected to the Internet through a modem 912 and the public line. Information is exchanged between the computer 911 and the digital camera 1 through a memory card 91 that can be set to the digital camera 1 and computer 911.

The Web server 6 of the support division is connected to the Internet through an interface 69 such as a router or a gateway and has a CPU 61, a memory 62, and a communication circuit 63 serving as the main processing components. The Web server 6 is connected with a hard disk 64 for storing various types of information through an interface.

The communication circuit 63 has a transmission circuit 631 and a receiving circuit 632 so that information and messages are transferred to and from the user's computer 911. The hard disk 64 stores an inspection program 641 to be executed by the digital camera 1 on the user's side, inspection results 642 which are execution results of the program, a diagnosis program 643 for the support division to perform diagnosis in accordance with the inspection results, a diagnosis result 644, a repair acceptance number 645 for the user, and home-page data 646 for displaying a home page on the user's computer 911 by the Web server 6. The inspection results 642, the diagnosis result 644, and the acceptance number 645 are temporarily stored.

Figure 28:
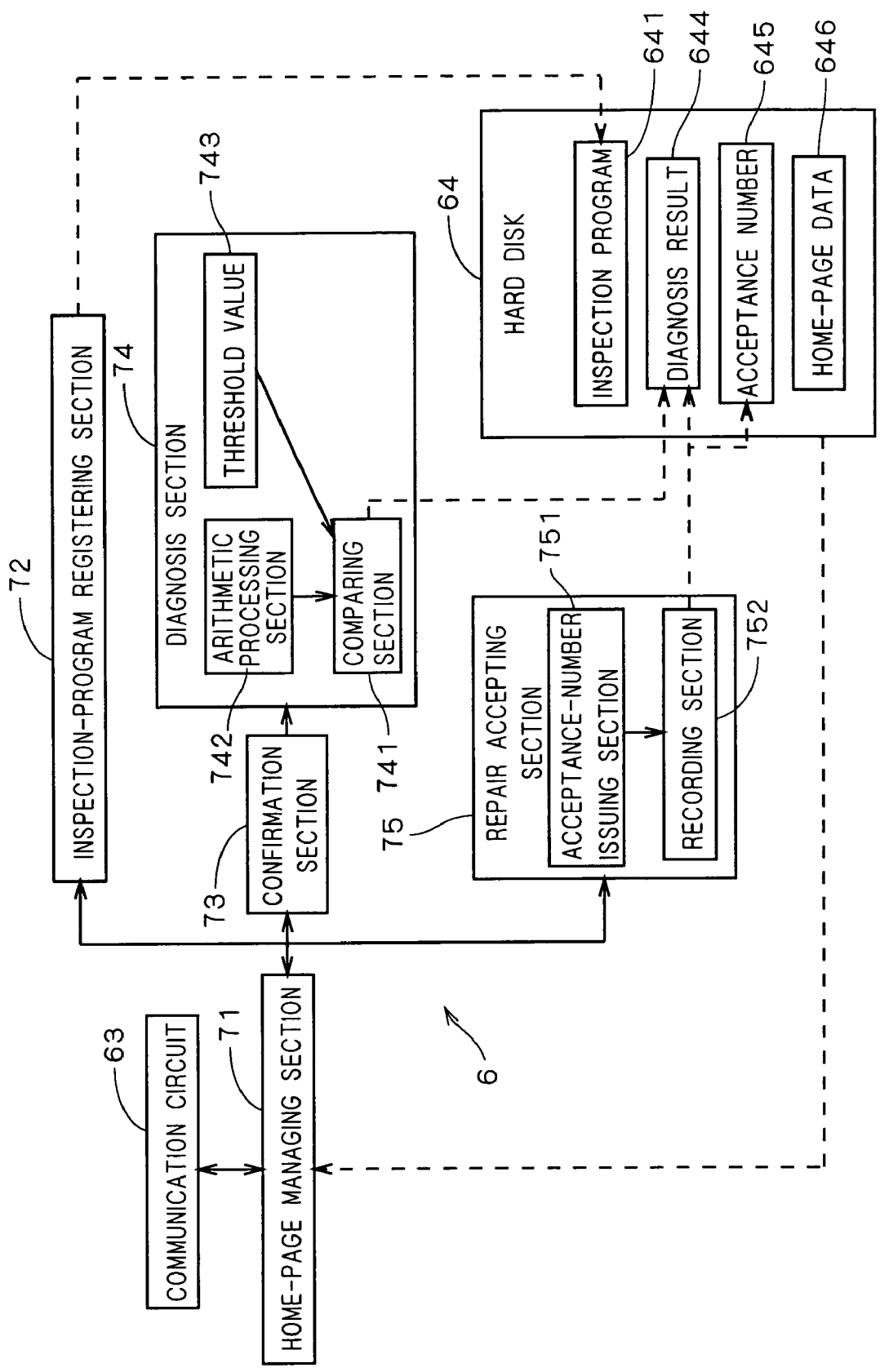
FIG. 28 is a block diagram showing functional components of the Web server.

FIG. 28 is a block diagram showing functional components together with the communication circuit 63 and the hard disk 64, and the functional components are realized by the processing of the CPU 61 in accordance with the diagnosis program 643 and the home-page data 646 which are stored in the memory 62.

A home-page managing section 71 is for controlling operations of the home page and communication of information with the user. An inspection-program registering section 72 is for managing the registration of the inspection program 641 that is downloaded by the user. A confirmation section 73 is for confirming whether an inspection result file uploaded from the user is a proper file, and a diagnosis section 74 is for diagnosing the digital camera 1 through the processing in accordance with the diagnosis program 643. A repair accepting section 75 is for accepting a request for repair from the user. Operations of components shown in the diagnosis section 74 and repair accepting section 75 will be described in the description of operation of the Web server 6.

Then, flows of procedures performed between the user and the support division shown in FIGS. 25 and 26 are described below by referring to the configuration shown in FIGS. 27 and 28.

When the user finds trouble of the digital camera 1, the user first accesses the home page of the support division through the computer 911 (window of the support division on computer is hereafter referred to as "support center") (step ST201). The user refers to a typical settlement method in accordance with the type of the trouble and performs operations (step ST202).

In the case where the trouble is not settled only by referring to the home page, the user downloads the inspection program 641 (self-inspection software) which is registered on the hone page (steps ST203, ST204, and ST221). FIG. 29 is an illustration showing a main menu for downloading the inspection program from the home page of the support center. After "downloading of self-inspection software" is selected in FIG. 29, the screen shown in FIG. 30 is displayed and the inspection program is taken into the user's computer by clicking "start". Display of the home page and transfer of a file are performed by the home-page managing section 71 of the Web server 6.

When downloading of the inspection program 641 is completed, the user records the inspection program 641 in the memory card 91 which is inserted into the computer 911. Thereby, the inspection card (a memory card in which inspection program is recorded is hereafter referred to as "inspection card 91") is prepared (step ST204).

Thereafter, the inspection card 91 is inserted into the card slot of the digital camera 1, and the self-inspection shown in FIG. 11 is executed similarly to the case of the first preferred embodiment. Through the self-inspection shown in FIG. 11, inspection results are recorded in the inspection card 91 (step ST205). In step S23 in FIG. 11, the URL of the home page of the support center is displayed for a certain period to prompt uploading of the inspection results which are stored in the inspection card 91 as an inspection-result file.

Figures 31, 32:
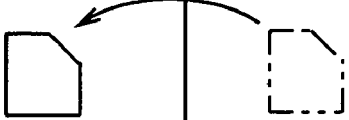
FIGS. 31 to 33 are illustrations showing home-page screens for uploading the inspection results.
Figure 33:

After the self-inspection is completed, the user extracts the inspection card 91 from the digital camera 1, inserts the card 91 into the computer 911, accesses the home page of the support center, and uploads the inspection-result file to the Web server 6 on the computer network (steps ST206 and ST222). That is, "uploading of inspection-result file" is selected in the menu shown in FIG. 29, the screen shown in FIG. 31 is displayed, pieces of private information such as address, name, telephone number, and e-mail address of the user are entered, then the screen shown in FIG. 32 is displayed, and the inspection-result file is dragged and dropped into the window. Thereby, the screen shown in FIG. 33 is displayed and the inspection-result file is uploaded. The uploaded inspection-result file is stored in the hard disk 64 of the Web server 6 as the inspection results 642 and brought into a readable state by the Web server 6.

Figure 34:
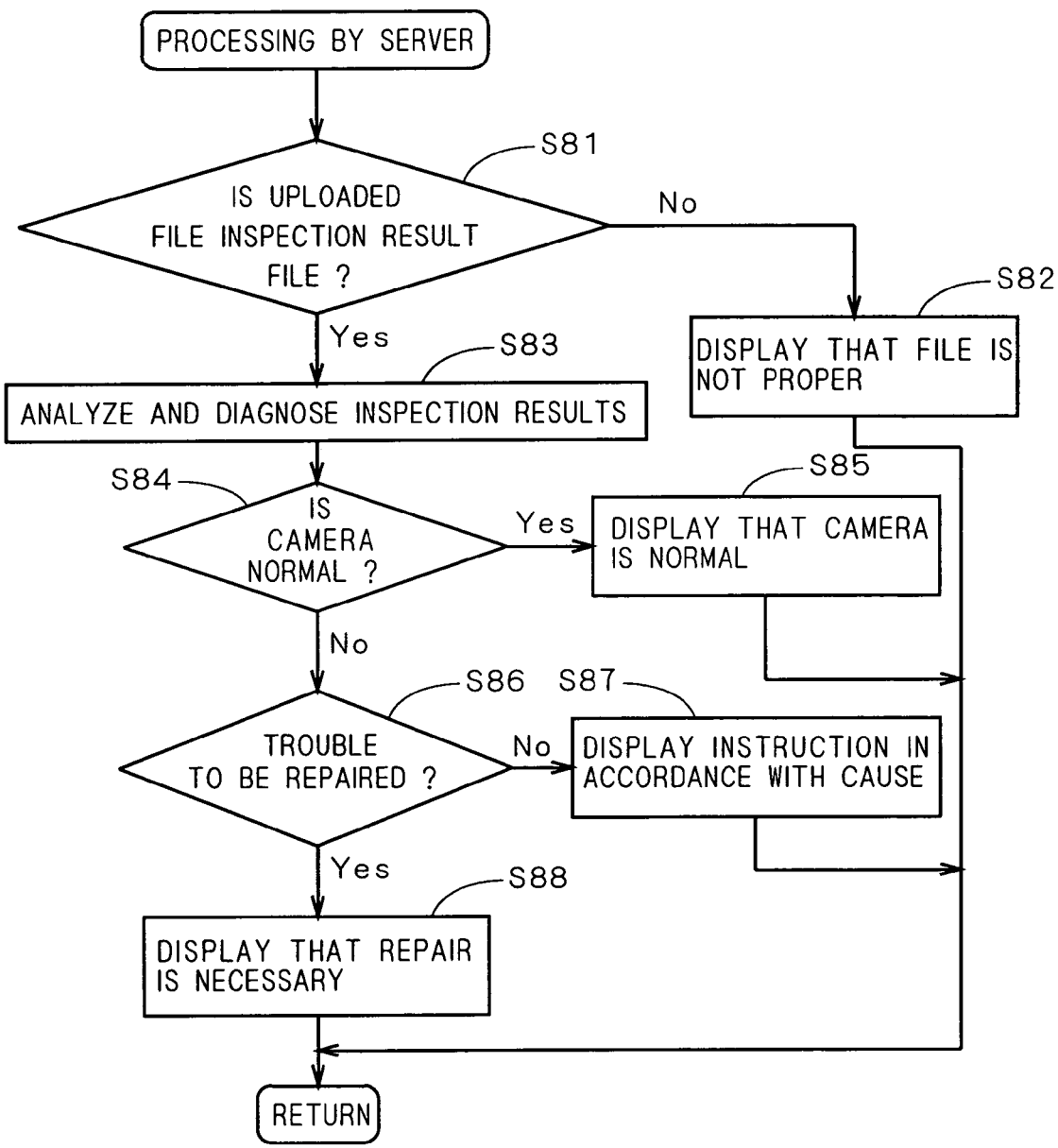
FIG. 34 is a flowchart showing a flow of operations for diagnosis in the Web server.

The Web server 6 accepting uploading of the inspection-result file reads out and analyses the inspection result 642, diagnoses the digital camera 1, and generates the diagnosis result 644. Thereafter, the diagnosis result 644 is transmitted to the user's computer 911 through computer communication and displayed toward the user (steps ST223, ST224, and ST207). FIG. 34 is a flowchart showing a flow of diagnosis in the Web server 6.

In the Web server 6, the confirmation section 73 confirms whether the file uploaded is an inspection-result file (step S81). If the file is not an inspection-result file, the Web server 6 transmits the screen shown in FIG. 35 toward the user to display that the file is not proper (step S82). Thereby, it is possible to cope with erroneous operations by the user.

If the uploaded file is proper, the diagnosis section 74 analyses the inspection results to perform diagnosis (step S83). The process of diagnosis is the same as the processing shown in FIG. 24. A comparing section 741 in the diagnosis section 74 compares predetermined threshold values 743 with diagnostic values included in the inspection results, and it is determined whether the digital camera 1 is normal, it has trouble not requiring repair, or it has trouble requiring repair. Moreover, when arithmetic processing is necessary like the case of diagnosis according processed image data, the diagnostic value calculated by the arithmetic processing section 742 through arithmetic processing is compared with the predetermined threshold value 743 and it is determined whether the digital camera 1 is normal, it has trouble not requiring repair, or it has trouble requiring repair. It is unnecessary that diagnosis results relating to diagnostic values are displayed on the Web server like the cases of steps S714, S716, and S717 (FIG. 24) of the first preferred embodiment.

When no problem is found in any diagnostic value as a result of diagnosis, the message is transmitted to and displayed for the user that the digital camera 1 is normal as shown in FIG. 36 to prompt the user to confirm the manual or the like (steps S84 and S85).

When a problem is found in any diagnostic value but trouble requiring repair of the camera 1 is not found as a result of diagnosis, the trouble settlement method is displayed for the user (steps S86 and S87). For example, in the case where the battery is exhausted (or remaining power is insufficient), instruction for replacing the battery is displayed as shown in FIG. 37. In the case where free area in the memory card is insufficient, the message is transferred to the user that the rest of area in the memory card is insufficient as shown in FIG. 38.

When a problem that cannot be solved by the user is found in any diagnostic value as a result of diagnosis, the message is transmitted to and displayed for the user that the camera 1 must be repaired (steps S86 and S88). FIG. 39 is an illustration showing the screen on the user's computer in the above case.

As described above, when a diagnosis result is transmitted to the user by the Web server 6 and displayed on the user's computer 911 (steps ST224 and ST207 in FIG. 26), repair is unnecessary and the trouble is settled by performing operations in accordance with instructions on the screen (steps ST208 and ST209).

On the other hand, when repair is necessary, the screen shown in FIG. 40 is displayed by clicking the repair acceptance button in FIG. 39 and the user enters necessary comments and requests repair. Thereby, an acceptance-number issuing section 751 of the repair accepting section 75 issues an acceptance number 645 for repair and the acceptance number 645 is displayed at the user's side as shown in FIG. 41 (step ST225). Moreover, a recording section 752 of the repair accepting section 75 relates the acceptance number 645 with the diagnosis result 644 and records them in the hard disk 64 for repair (step ST226).

The diagnosis in the support center classifies the digital camera 1 into a normal state, a state having trouble requiring no repair, and a state having trouble requiring repair to derive the diagnosis result; therefore, the user can quickly determine what to do next in accordance with the diagnosis result. Moreover, when the digital camera 1 must be repaired, the user can immediately request repair of the camera 1 on the home page.

When the digital camera 1 must be repaired, the user records the repair acceptance number (step ST210) and sends the digital camera 1 to the support division together with a form showing the acceptance number (step ST211).

The support division receiving the digital camera 1 (step ST227) first finds out the diagnosis result 644 related to the issued acceptance number 645 (step ST228). Then, the support division repairs the digital camera 1 while referring to the diagnosis result which is already prepared (step ST229). After repair is completed, the support division sends the digital camera 1 back to the user and thus, the support procedure is completed (steps ST230 and ST212).

When "inquiry about repair state" is selected in FIG. 29, the screen shown in FIG. 42 is displayed, and after inputting the acceptance number, the user can easily confirm a repair state as shown in FIG. 43.

The support system of the second preferred embodiment is described above. In this preferred embodiment, it is possible to provide the inspection program for the user through computer communication and quickly and properly diagnose the digital camera 1, which exists on the user's side, in the support center because the inspection results are also returned to the support center through computer communication.

It is also possible to minimize the cost for sending the digital camera 1 because the diagnosis result includes whether the digital camera 1 must be repaired similarly to the case of the first preferred embodiment.

The steps ST221 to ST226 in FIGS. 25 and 26 are processed by the Web server 6 and therefore, great reduction of the labor cost in the support division is further realized and it is possible to minimize the opportunity loss of the user.

The user can quickly know the operation to be performed and the stress of the user is also reduced because the inspection results are analyzed by the Web server 6 immediately after they are uploaded.

Furthermore, acceptance of repair and inquiry about the repair state are performed through communication on the computer network and therefore, the user can easily and reliably request repair.

Figure 44:
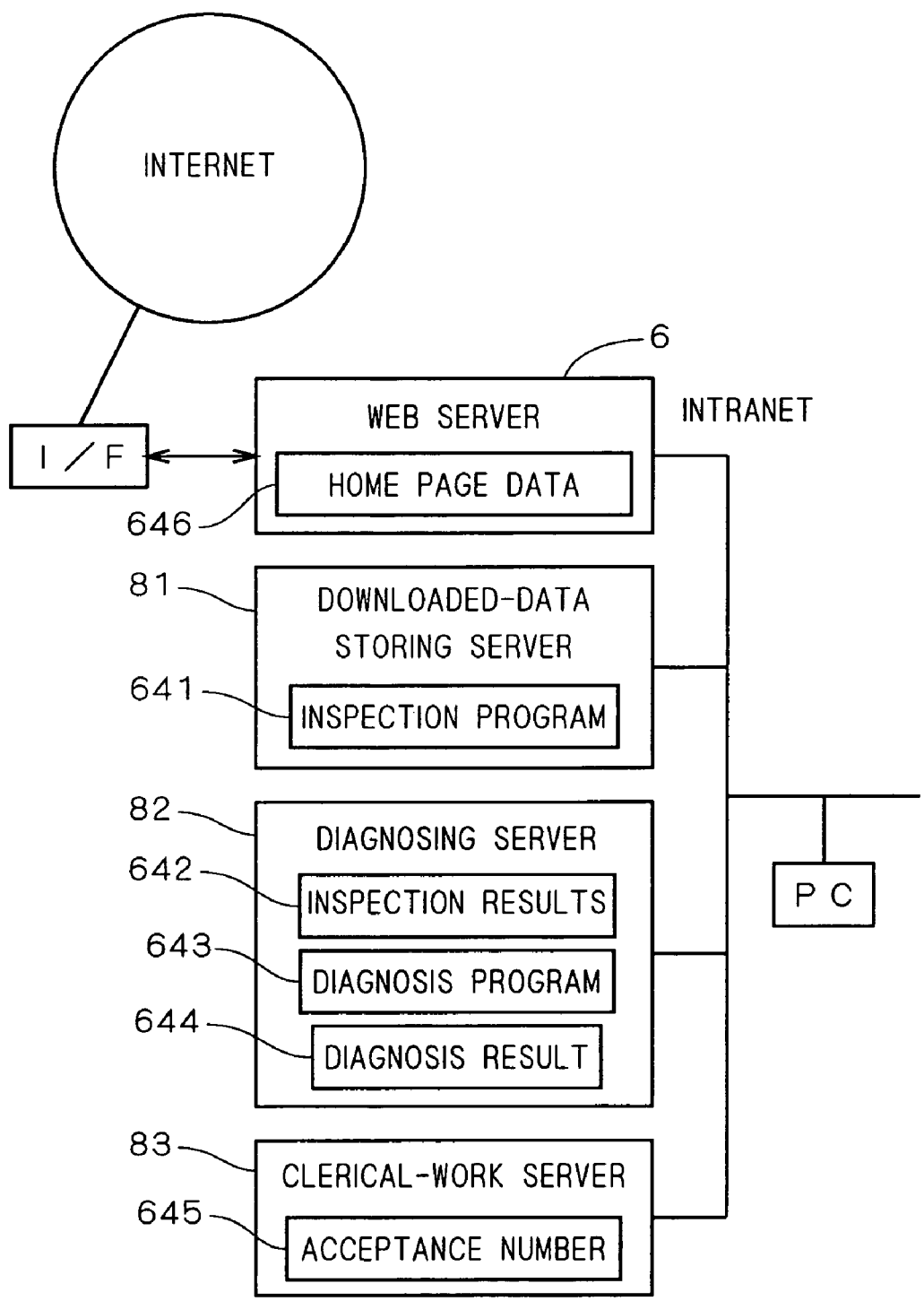
FIG. 44 is an illustration showing a configuration of servers for distributing processing in the support center through an intranet.

In the above-described example, the inspection program 641, the inspection results 642, the diagnosis program 643, the diagnosis result 644, and the acceptance number 645 are stored in the hard disk 64 connected to the Web server 6 together with the home-page data 646. As shown in FIG. 44, however, it is also allowed to disperse severs for respective functions.

In FIG. 44, the home-page data 646 is stored in a Web server 6, the inspection program 641 is stored in a downloaded-data storing server 81, the inspection results 642, the diagnosis program 643, and the diagnosis result 644 are stored in a diagnosing server 82, and the acceptance number 645 is stored in a clerical-work server 83. These servers are connected through an intranet and also connected to other PCs.

The URL of other server is entered in the contents of the home page of the support center so that data can be transferred to and from a server other than the Web server 6 while the user accessing the URL is not conscious of it. By using the distributed processing, particularly by separately providing the diagnosing server 82, it is possible to execute diagnosis at a high speed and quickly send the diagnosis result to the user. Moreover, an operator in the service center can perform accurate repair while accessing the diagnosing server 82 or the clerical-work server 83 from the PC in hand through the intranet.

3. Third Preferred Embodiment

Then, as the support system of the third preferred embodiment, an example is described in which a plurality of the inspection programs 641 in the second preferred embodiment are prepared for every inspection item (that is, every diagnosis item corresponding to every function of the digital camera 1). The example is described below by properly using the symbols used for the second preferred embodiment.

Figure 45:
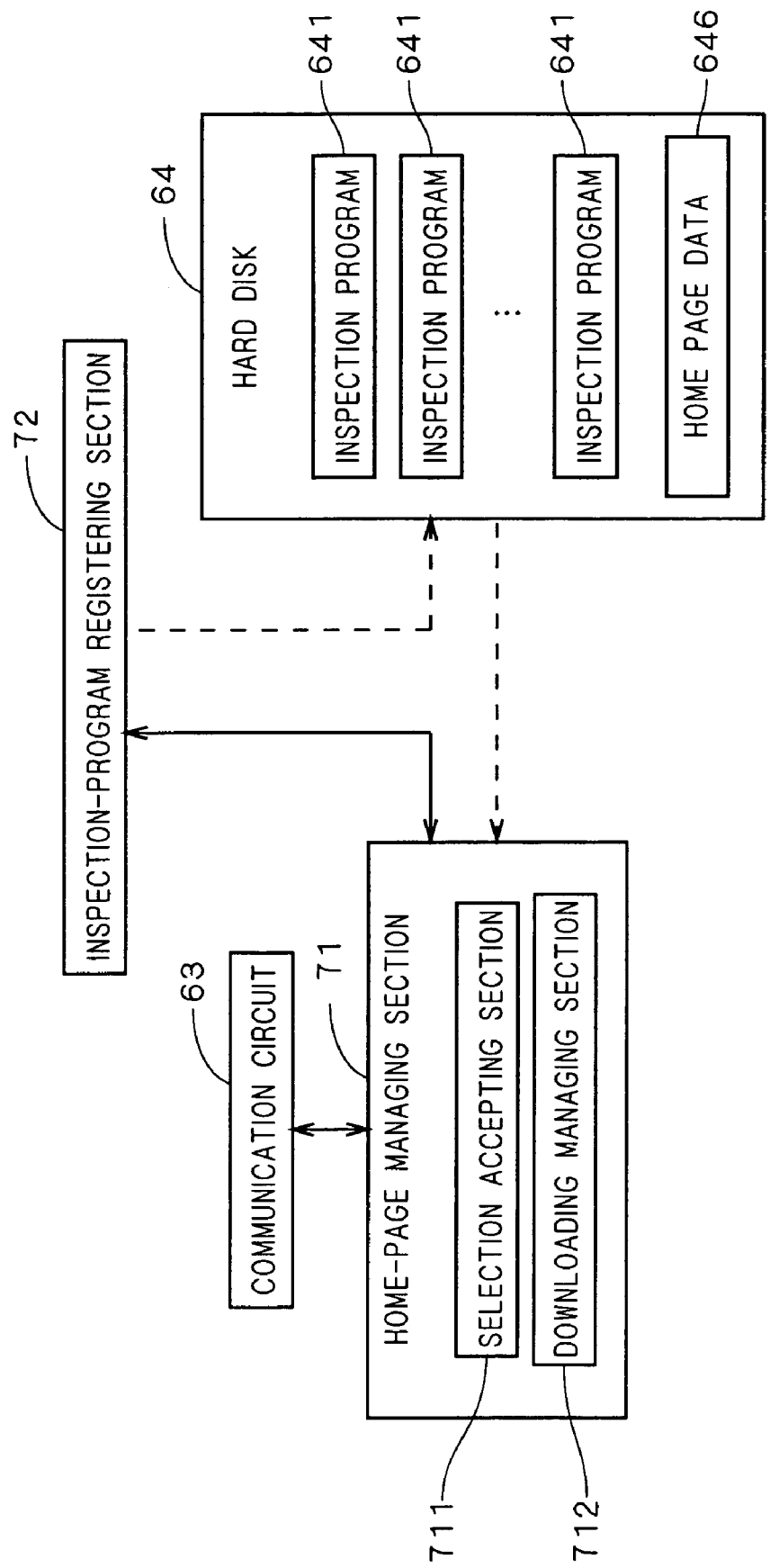
FIG. 45 is a block diagram showing functional components of the Web server for handing a plurality of inspection programs.

FIG. 45 is an illustration showing functional components for realizing that the user downloads selected one of the inspection programs 641 by the CPU 61 and the memory 62 of the Web server 61 together with other components. Among the components shown in FIG. 28, FIG. 45 shows the communication circuit 63, the home-page managing section 71, the inspection-program registering section 72, and the hard disk 64. Only the internal components of the home-page managing section 71 and the information recorded in the hard disk 64 which relate to downloading of the inspection programs 641 are illustrated.

Figure 46:
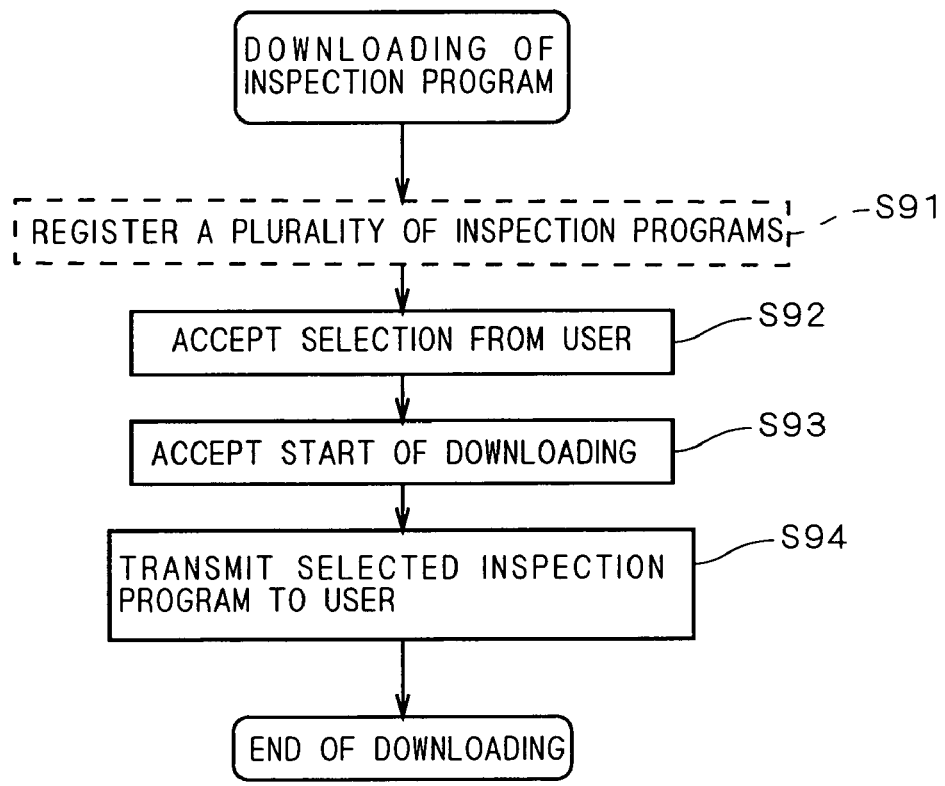
FIG. 46 is a flowchart showing a flow of operations of the Web server in downloading of an inspection program.

FIG. 46 is a flowchart showing a flow of operations of the Web server 6 of the support division in selecting and downloading one of the inspection programs 641, and shows steps corresponding to the step ST221 in FIG. 25.

Figure 47:
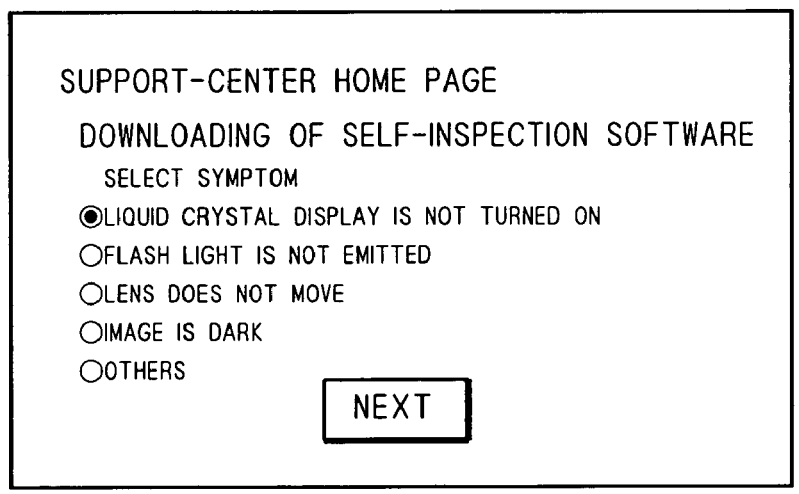
FIG. 47 is an illustration showing a home-page screen for selecting an inspection program.

First, as previous preparation, in the Web server 6, the inspection programs 641 in the hard disk 64 are registered on the home page by the inspection-program registering section 72 (step S91). This step is executed only once before the following steps which are repeatedly executed for every request from the user. FIG. 47 is an illustration showing a screen to be displayed when "downloading of self-inspection software" is selected in the main menu shown in FIG. 29. As shown in FIG. 47, a plurality of inspection programs which correspond to the troubles of liquid crystal display (LCD), flash, lens, image quality, and the like, respectively, are registered on the home page.

When the user selects an item in accordance with the type of trouble, a selection accepting section 711 of the home-page managing section 71 of the Web server 6 accepts the selection and specifies the inspection program 641 to be downloaded (step S92). FIG. 47 shows a screen in which a radio button of the item of "liquid crystal does not display" is selected.

When the button for "next" is clicked in FIG. 47, the screen shown in FIG. 30 is displayed by the home-page managing section 71. After the home-page managing section 71 accepts the "start" button operation by the user (step S93), the Web server 6 transmits the selected inspection program 641 to the user (step S94).

Thereafter, the user stores the inspection program downloaded to a memory card similarly to the case of the second preferred embodiment (step ST204 in FIG. 25) and the self-inspection by the digital camera 1 (step ST205), uploading of the inspection results (steps ST206 and ST222), and diagnosis by the Web server 6 (step ST223 in FIG. 26) are performed in order. Procedures performed between the user and the support center (support division) from step ST223 downward are the same as the case of the second preferred embodiment as shown in FIG. 26.

In the case of the third preferred embodiment, only an inspection program of a diagnosis item desired by the user is downloaded and therefore, the self-inspection in the digital camera 1 is performed only for a specific inspection item.

For example, when "liquid crystal display is not tuned on" in FIG. 47 is selected, a program for inspecting only the LCD 10 and the image processing unit 200 (of course, an inspection of other component may be included if necessary) is downloaded and only self-inspections of the LCD 10 and the image processing unit 200 are performed and only the inspection result of the specific inspection item is uploaded. Moreover, the diagnosis by the Web server 6 is performed only for diagnosis items of the LCD 10 and the image processing unit 200.

As a result, it is possible to greatly reduce the loads for support of the user and the support center. Specifically, by preparing an inspection program of every inspection item corresponding to the state of trouble, the size of the inspection program and the time for downloading of the inspection program are reduced. Moreover, because the size of the inspection-result file is reduced, it is possible to reduce the time for uploading of the inspection results and the time for diagnosis by the Web server 6.

As described above, the third preferred embodiment makes it possible to properly determine whether the digital camera 1 must be repaired without transporting the camera 1 similarly to the second preferred embodiment. Therefore, not only the support cost reduces but also proper quick diagnosis is realized in accordance with the state of the trouble by preparing a plurality of inspection programs, even if the digital camera 1 has sophisticated and complicated functions.

4. Fourth Preferred Embodiment

Then, the fourth preferred embodiment is described below in which the inspection program is previously stored in the digital camera 1 instead of obtaining the inspection program after the user's purchase of the digital camera 1.

FIG. 48 is a flowchart showing general operations of the digital camera 1 of the fourth preferred embodiment relative to the self-inspection operation, which corresponds to FIG. 10. The self-inspection operation is the same as the case of the first preferred embodiment and the configuration of the digital camera 1 is also the same as the case of the first preferred embodiment except that the inspection program and the test image data are previously stored in the flash ROM 211b shown in FIG. 5. Also in the following description, symbols used for description of the first preferred embodiment are properly used.

In the digital camera 1, the self-inspection is executed by pressing the power-supply switch 227 while pressing the shutter start button 8. That is, when the power-supply switch 227 is pressed, the overall control unit 211 and the card I/F 212 transfer signals to each other (step S11) and thereafter, it is confirmed whether the shutter start button 8 is pressed (step S15).

If the shutter start button 8 is not pressed, the normal operation (step S13) for turning on the power supply is started. In the case where the shutter start button 8 is pressed, the operation of the self-inspection is determined and it is confirmed whether an inspection card (memory card) 91 for recording inspection results is inserted into the card slot (step S12).

If the inspection card 91 is not inserted, the normal operation (step S13) is started because the self-inspection cannot be executed. In the case where the inspection card 91 is inserted, the self-inspection (step S20) is executed. As a result, the self-inspection shown in FIG. 11 is executed and inspection results are recorded in the inspection card 91. After the self-inspection is completed, the power supply of the digital camera 1 is automatically turned off (step S14).

The inspection card 91 in which the inspection results are recorded is sent to the support division as in the case of the first preferred embodiment, or the inspection results are uploaded to the home page of a support center through computer communication as in the case of the second preferred embodiment, and the digital camera 1 is diagnosed by the support division. Then, it is informed to the user whether the camera 1 must be repaired in accordance with the diagnosis result.

Because the inspection program and the test image data are previously stored in the flash ROM 211b, it is possible to use a general-purpose memory card for recording as the inspection card 91.

As described above, in the fourth preferred embodiment, the inspection program is previously stored in the digital camera 1 and therefore, it is unnecessary for the user to obtain the inspection program. Moreover, because it is properly diagnosed by the support division whether the digital camera 1 on the user's side must be repaired, it is possible to prevent the digital camera 1 from being unnecessarily sent to the support division. Thereby, the support cost required for the user and the support division reduces.

5. Fifth Preferred Embodiment

The fifth preferred embodiment in which a part of the above diagnosis is performed in the digital camera 1 is described below. It is assumed that the configuration of the digital camera 1 is the same as that in FIG. 5 and the procedures between the user and the support division is the same as the case of the second preferred embodiment. However, the fifth preferred embodiment is different from the second preferred embodiment in that step S23 in FIG. 11 is replaced with steps S231 to S237 in FIG. 49 for self-inspection. Moreover, symbols already used for previous description are properly used for the following description.

In the digital camera 1 of the fifth preferred embodiment, when a series of inspections in the self-inspection (step S20 in FIG. 10) is completed, the diagnosis of troubles not requiring repair is executed in the digital camera 1.

Figure 49:
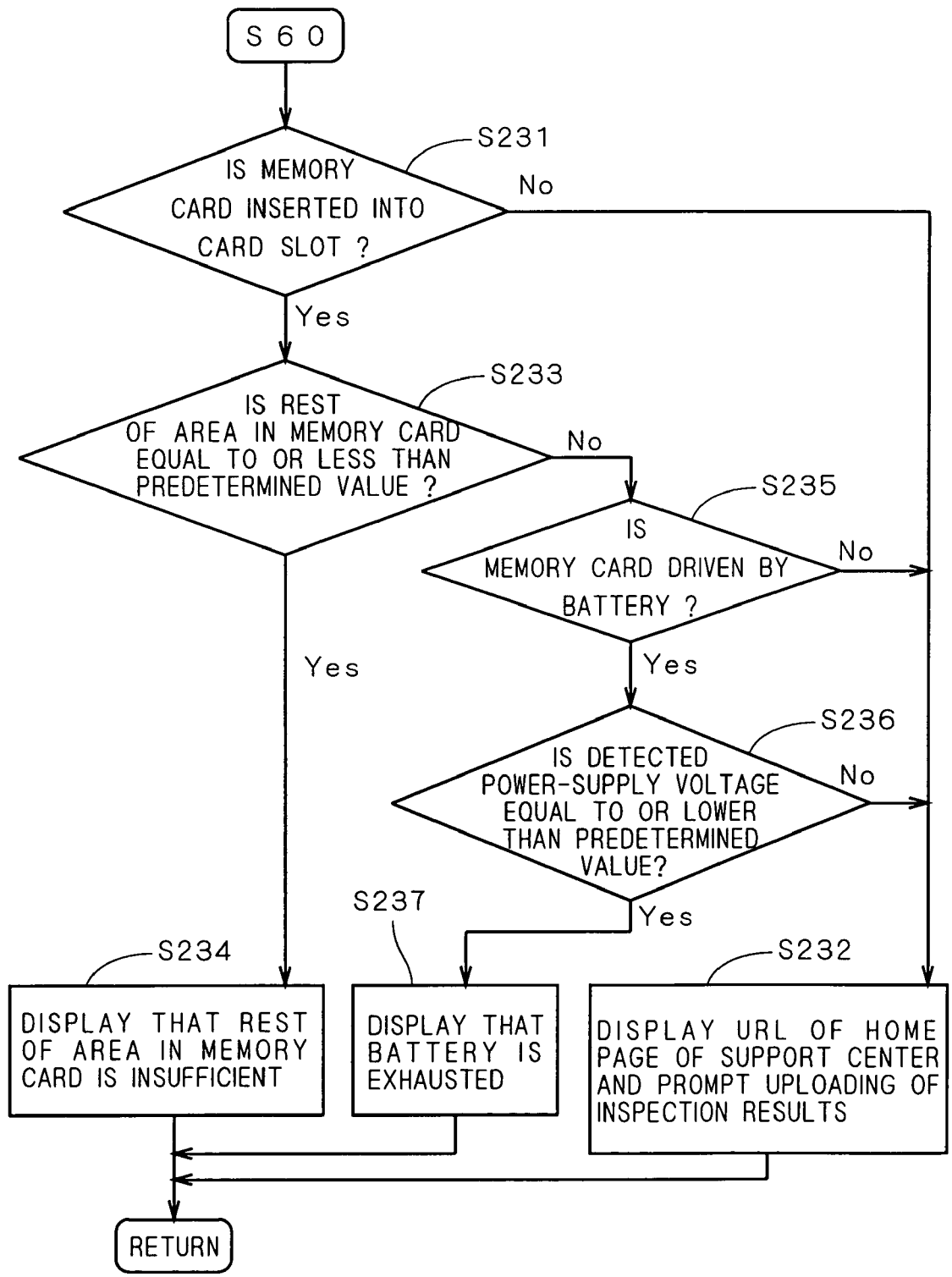
FIG. 49 is a flowchart showing a flow of operations of the digital camera for performing a part of diagnosis.
Figure 50:
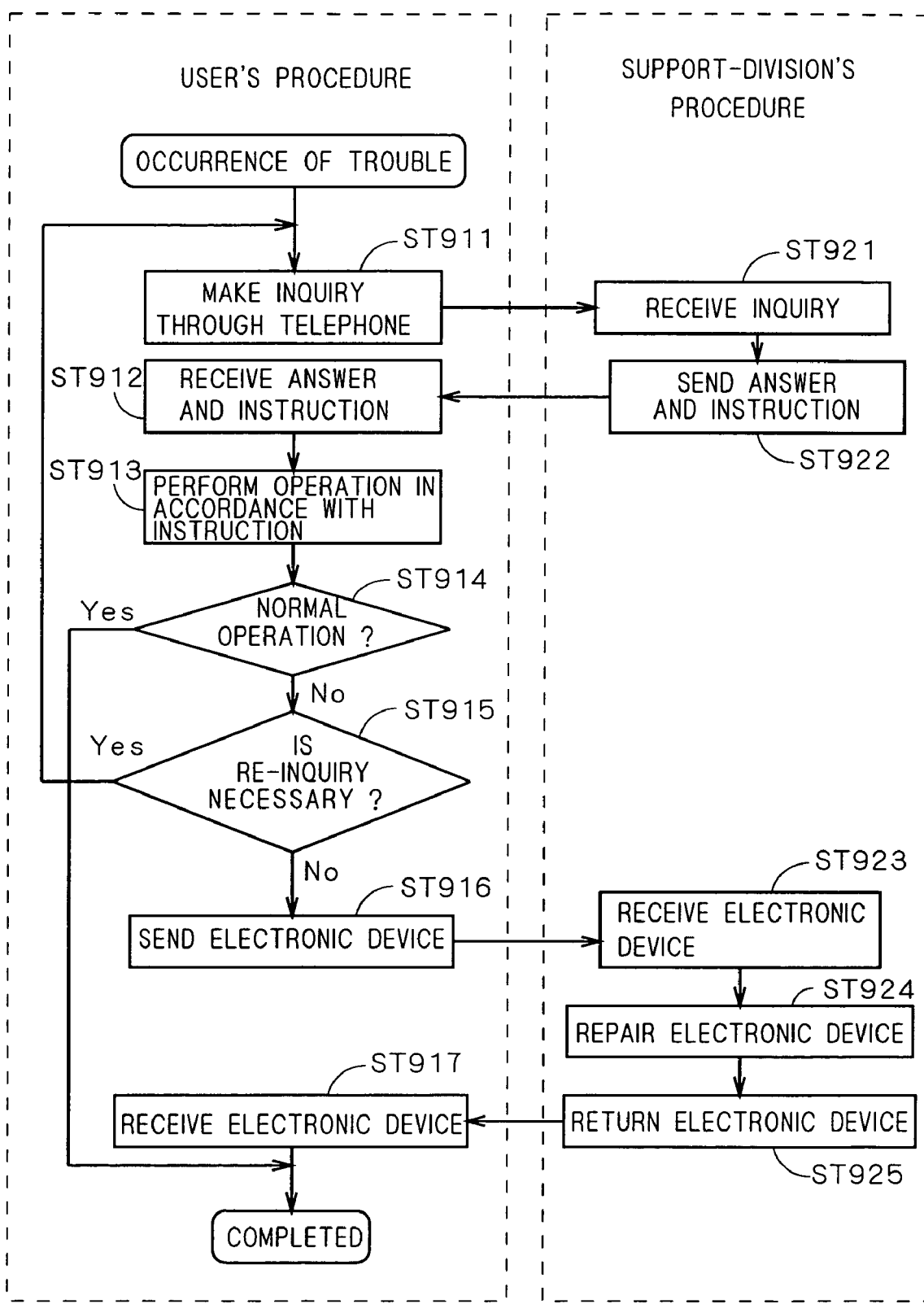
FIG. 50 is a flowchart showing a conventional flow of procedures between a user and a support division.

Specifically, as shown in FIG. 49, it is confirmed whether a memory card other than the inspection card 91 is inserted into any card slot (step S231), and if no memory card is inserted, it is assumed that the digital camera 1 has trouble independent of the rest of area in the memory card. The user is prompted to upload inspection results to the home page of the support center because the digital camera 1 is assumed to have trouble out of the diagnostic items executed in the camera 1. That is, the URL of the home page of the support center is displayed on the LCD 10 and it is displayed that the inspection-result file must be uploaded to the home page (step S232).

In the case where a memory card other than the inspection card 91 is inserted, it is confirmed whether the rest of area in the memory card is equal to or less than a predetermined threshold value (step S233).

If the rest of area is equal to or less than the threshold value, the trouble may occur in the digital camera 1 due to the insufficient rest of area (steps S233 and S234) and it is displayed on the LCD 10 that the rest of area in the memory card is insufficient.

In the case where the memory card is inserted but the rest of area in the memory card is sufficient, it is confirmed whether the digital camera 1 is currently driven by the battery (step S235). If the digital camera 1 is driven by the AC adapter, it is displayed to upload inspection results to the home page of the support center because it is impossible to determine whether the cause lies in the power battery 236 (step S232).

If the digital camera 1 is driven by the power battery 236, it is confirmed whether the power-supply voltage detected in the self-inspection is equal to or lower than a predetermined threshold value (step S236). When the power-supply voltage is equal to or lower than the predetermined threshold value, it is displayed on the LCD 10 that the battery is exhausted (step S237). When the battery is not exhausted, it is estimated that there is another cause of the trouble of the digital camera 1 and thus, it is displayed to upload the inspection results to the home page of the support center (step S232).

As described above, in the digital camera 1 of the fifth preferred embodiment, trouble which can be easily diagnosed and can be settled by the user is diagnosed by the digital camera 1. When the above trouble is present, it is possible for the user to quickly cope with the trouble by displaying the cause (or the settlement method) on the LCD 10.

Inspection results are uploaded only when other trouble (including a case in which the camera 1 is normal but the user guesses wrong) is recognized by the user. Therefore, it is possible to reduce the load for uploading inspection results and further reduce the support cost.

Though the above description is made as a modification of the second preferred embodiment, it is also allowed that the inspection program or the inspection results are transferred through an inspection card as in the case of the first preferred embodiment.

<6. Modifications>

Preferred embodiments of the present invention are described above. However, the present invention is not restricted to the above preferred embodiments. Various modifications are allowed.

For example, the above preferred embodiments are described by referring to the digital camera 1 as an example of household electronic devices. However, it is allowed to use an electronic device other than the digital camera 1. Particularly, the present invention makes it possible to reduce the support cost for advanced-functional complex electronic devices and is applicable to every electronic device such as a computer or a peripheral device connected to a computer if it is possible to transfer an inspection program and/or inspection results of the device. Inspection performed by an electronic device naturally corresponds to the type of the electronic device.

The function card 92 attached to an electronic device and to be inspected is not restricted to the communication card of the above preferred embodiments. For example, it is allowed to use other type of function card such as an audio card. In this case, inspection signals corresponding to the type of the function card is transmitted to the function card in step S415 in FIG. 18.

Furthermore, though the inspection program and the inspection results are transferred between the user and the support division through the inspection card in the first preferred embodiment, and the inspection program and the inspection results are transferred through computer communication (that is, in the form of electric signals) in the second preferred embodiment, it is allowed to optionally use the inspection card which is a recording medium or computer communication in each case of transferring the inspection program and the inspection results.

For example, if the inspection program is large, it is allowed that the inspection program is sent from the support division to the user while it is stored in the inspection card, and the inspection results whose volume is small are uploaded through computer communication. If the inspection program is small but the volume of the inspection results is large, the inspection program may be downloaded through computer communication and received by the support division while the inspection results are stored in the inspection card.

Moreover, though the inspection program is supplied to the user while the program is stored in the inspection card which is a memory card in the case of the first preferred embodiment, the inspection card is not restricted to a memory card. It is allowed to use other recording medium such as a magnetic disk or an optical disk.

That is, the present invention reduces the support cost by not delivering an electronic device until it is confirmed through advanced diagnosis that trouble to be repaired is present in the electronic device.

Though the Web server 6 diagnoses the inspection results in the second preferred embodiment, it is also allowed that another computer connected to the Web server 6 accepts diagnosis or repair. That is, as long as the user can recognize that the server of the support center substantially analyzes the inspection results, any configuration of the computer system of the support center is applicable.

It is not necessary that the hard disk 64 is separate from the Web server 6. It is allowed that the hard disk 64 is connected to the Web server 6 as a part of the Web server 6. Furthermore, the hard disk 64 may be a hard disk system comprising at least one hard disk. The hard disk 64 is not restricted to a magnetic disk. For example, it is allowed that the inspection program is stored in another type of a recording medium dedicated to reading.

Furthermore, inspection and diagnosis of the digital camera 1 in the above preferred embodiments may include inspection and diagnosis of optional attachments attached to the body of the digital camera 1. That is, the electronic device to be supported is recognized to have a configuration including the attachments. Therefore, the inspection program may include a program for inspecting the attachments. The inspection of the optional attachments is executed only when the optional attachments are attached.

While the invention has been shown and described in detail, the foregoing description is in all aspects illustrative and not restrictive. It is therefore understood that numerous other modifications and variations can be devised without departing from the scope of the invention.

What is claimed is:

1. A method of diagnosing an electronic device which belongs to a customer, said method comprising the steps of:
   receiving and validating an inspection result automatically obtained by an inspection program by executing the inspection program on said electronic device on said customer's side, the inspection result being received by computer communication;
   obtaining a diagnosis result by diagnosing said electronic device on the basis of said inspection result, said diagnosis result including a diagnosis result about an electronic card attached to said electronic device;
   transmitting said diagnosis result to said customer;
   accepting a request of repair from said customer through computer communication;
   issuing an acceptance number of repair to said customer;
   recording said diagnosis result with said acceptance number;
   receiving said electronic device from said customer;
   finding out said diagnosis result related to said acceptance number;
   repairing said electronic device in accordance with said diagnosis result; and
   sending said electronic device back to said customer.

2. A method of diagnosing an electronic device which belongs to a customer, said method comprising the steps of:
   a) receiving an inspection result obtained by executing an inspection program on said electronic device on said customer's side; and
   b) obtaining a diagnosis result by diagnosing said electronic device on the basis of said inspection result, said diagnosis result including information which indicates a state where selected from the group comprising:
   a first state where said electronic device is normal;
   a second state where said electronic device has trouble but needs no repair; and
   a third state where said electronic device needs repair.

3. The method of claim 2, wherein
   said second state includes a state where remaining power in a battery provided for said electronic device is insufficient.

4. The method of claim 2, wherein
   said second state includes a state where rest of area in a memory provided for said electronic device is insufficient.

5. The method of claim 2 further comprising the steps of:
   c) accepting selection of an inspection program out of a plurality of inspection programs from said customer, wherein said step c) is performed before said step a).

6. The method of claim 5, further comprising the step of
   d) transmitting said inspection program to said customer through computer communication, wherein
   said step d) is performed following said step c) and before said step a).

7. A method of diagnosing an electronic device which belongs to a customer, said method comprising the steps of:
   a) sending a computer-readable medium carrying an inspection program to said customer;
   b) receiving a computer-readable medium carrying an inspection result, said inspection result obtained by said customer executing said inspection program on said electronic device; and
   c) reading out said inspection result from said computer-readable medium.

8. A method of serving an inspection program for an electronic device which belongs to a customer, said method comprising the steps of:
   a) preparing an inspection program; and
   b) supplying said inspection program to said customer, wherein an inspection result is generated by execution of said inspection program on said electronic device on said customer's side so as to obtain the inspection result automatically, and diagnosis of said electronic device is performed on the basis of said inspection result, said diagnosis result including information which indicates a state selected from the group comprising:
   a first state where said electronic device is normal;
   a second state where said electronic device has trouble but needs no repair; and
   a third state where said electronic device needs repair.

9. An apparatus for diagnosing an electronic device through computer communication, said electronic device belonging to a customer, said apparatus comprising:
   a receiving circuit for receiving an inspection result obtained automatically by an inspection program by executing the inspection program on said electronic device on said customer's side; and
   a processor for obtaining a diagnosis result by diagnosing said electronic device on the basis of said inspection result, said diagnosis result including information which indicates a state selected from the group comprising:
   a first state where said electronic device is normal:
   a second state where said electronic device has trouble but needs no repair; and
   a third state where said electronic device needs repair.

10. The apparatus of claim 9, wherein
    said processor compares a value included in said inspection result with a predetermined threshold value, to thereby judge whether said electronic device needs repair or not.

11. The apparatus of claim 9, wherein
    said processor calculates a value for diagnosis from said inspection result, and compares said value for diagnosis with a predetermined threshold value, to thereby judge whether said electronic device needs repair or not.

12. The apparatus of claim 9, wherein
    said processor judges whether data received as an inspection result is a valid inspection result or not.

13. The apparatus of claim 9, further comprising
    a transmitting circuit for transmitting said diagnosis result toward said customer.

14. The apparatus of claim 13, wherein
    said processor accepts a request of repair from said customer.

15. The apparatus of claim 14, wherein
    said processor issues an acceptance number of repair to said customer, and records said diagnosis result with said acceptance number.

16. The apparatus of claim 9, wherein
    said diagnosis result includes information whether said electronic device needs repair or not.

17. A computer-readable medium carrying a program for diagnosing an electronic device through computer communication, said electronic device belonging to a customer, wherein execution of said program by a computer causes said computer to perform a process comprising the steps of:
    a) receiving an inspection result automatically obtained by an inspection program by executing the inspection program on said electronic device on said customer's side; and b) obtaining a diagnosis result by diagnosing said electronic device on the basis of said inspection result, said diagnosis result including information which indicates a state selected from the group comprising:

a first state where said electronic device is normal;

a second state where said electronic device has trouble but needs no repair; and a third state where said electronic device needs repair.

18. The computer-readable medium of claim 17, wherein said computer-readable medium is a hard disk system connected to a server on a computer network.

* * * * *